(12) United States Patent
Nakai et al.

(10) Patent No.: US 10,804,505 B2
(45) Date of Patent: Oct. 13, 2020

(54) BATTERY PACK AND METHOD FOR PRODUCING BATTERY PACK

(71) Applicant: Nissan Motor Co., Ltd., Yokohama-shi, Kanagawa (JP)

(72) Inventors: Masayuki Nakai, Kanagawa (JP); Yasuhiro Yanagihara, Kanagawa (JP)

(73) Assignee: Envision AESC Japan Ltd., Zama (JP)

(*) Notice: Subject to any disclaimer, the term of this patent is extended or adjusted under 35 U.S.C. 154(b) by 0 days.

(21) Appl. No.: 15/769,098

(22) PCT Filed: Oct. 22, 2015

(86) PCT No.: PCT/JP2015/079901
§ 371 (c)(1),
(2) Date: Apr. 18, 2018

(87) PCT Pub. No.: WO2017/068706
PCT Pub. Date: Apr. 27, 2017

(65) Prior Publication Data
US 2018/0301667 A1 Oct. 18, 2018

(51) Int. Cl.
*H01M 2/02* (2006.01)
*H01M 2/26* (2006.01)
(Continued)

(52) U.S. Cl.
CPC ....... *H01M 2/0212* (2013.01); *H01M 2/1077* (2013.01); *H01M 2/202* (2013.01);
(Continued)

(58) Field of Classification Search
CPC combination set(s) only.
See application file for complete search history.

(56) References Cited

U.S. PATENT DOCUMENTS

2004/0050414 A1* 3/2004 Oogami ............ H01M 2/0207 136/249
2008/0118821 A1* 5/2008 Gehring ............ H01M 2/202 429/92
(Continued)

FOREIGN PATENT DOCUMENTS

CN 101176223 A 5/2008
CN 102195071 A 9/2011
(Continued)

OTHER PUBLICATIONS

Dictionary entry for "join" (The Collaborative International Dictionary of English), accessed via www.freedictionary.org (Year: 1913).*

*Primary Examiner* — Amanda J Barrow
(74) *Attorney, Agent, or Firm* — Global IP Counselors, LLP

(57) ABSTRACT

A battery pack includes a cell group, a bus bar and a terminal member. The cell group includes a plurality of unit cells stacked in a thickness direction. Each of the unit cells includes a battery main body having a power generation element and a flat shape, and an electrode tab protruding out from the battery main body and arranged along a stacking direction. The bus bar is joined to the electrode tabs and electrically connects the electrode tabs. The terminal member is joined to the bus bar to transfer input and output of electric power in the cell group. The terminal member is joined to the bus bar at a terminal joining position that is spaced away from a joining position between the bus bar and the electrode tabs when viewing a surface on which the electrode tabs are arranged from a direction that is orthogonal to the surface.

7 Claims, 17 Drawing Sheets

(51) Int. Cl.
*H01M 2/10* (2006.01)
*H01M 2/20* (2006.01)
*H01M 2/30* (2006.01)

(52) U.S. Cl.
CPC ........... *H01M 2/206* (2013.01); *H01M 2/263* (2013.01); *H01M 2/30* (2013.01)

(56) References Cited

U.S. PATENT DOCUMENTS

| | | | | |
|---|---|---|---|---|
| 2011/0097608 | A1* | 4/2011 | Park | H01M 2/0207 429/7 |
| 2011/0229754 | A1* | 9/2011 | Zhao | H01M 2/266 429/158 |
| 2012/0040223 | A1* | 2/2012 | Odumodu | H01M 2/1077 429/120 |
| 2013/0065103 | A1* | 3/2013 | Yumura | E02F 9/0858 429/120 |
| 2013/0089773 | A1* | 4/2013 | Kim | H01M 2/202 429/158 |
| 2013/0196211 | A1* | 8/2013 | Park | H01M 2/30 429/156 |
| 2013/0236792 | A1* | 9/2013 | Terado | H01M 2/024 429/246 |
| 2014/0363728 | A1* | 12/2014 | Nishikawa | H01M 2/266 429/160 |
| 2015/0132622 | A1* | 5/2015 | Gohl | H01M 2/0434 429/90 |
| 2016/0211499 | A1* | 7/2016 | Cho | H01M 2/204 |
| 2016/0233476 | A1* | 8/2016 | Okamoto | H01G 11/76 |
| 2018/0159096 | A1* | 6/2018 | Kim | H01M 2/26 |

FOREIGN PATENT DOCUMENTS

| | | | |
|---|---|---|---|
| CN | 104081559 | A | 10/2014 |
| CN | 104979522 | A | 10/2015 |
| JP | 2004-253262 | A | 9/2004 |
| JP | 2009-519565 | A | 5/2009 |
| JP | 2010-519676 | A | 6/2010 |
| JP | 2012-22964 | A | 2/2012 |
| JP | 2012-49131 | A | 3/2012 |
| JP | 2012-515418 | A | 7/2012 |
| JP | 2013-229266 | A | 11/2013 |
| JP | 2014-22195 | A | 2/2014 |
| JP | 2014-521197 | A | 8/2014 |
| JP | 2015-153486 | A | 8/2015 |
| KR | 10-2008-0036258 | A | 4/2008 |
| WO | 2007/121445 | A2 | 10/2007 |
| WO | 2013/051012 | A3 | 6/2013 |
| WO | 2014/011801 | A1 | 1/2014 |
| WO | 2015/037505 | A1 | 3/2015 |
| WO | WO 2015/037505 | * 3/2015 | ............. H01M 2/20 |

* cited by examiner

BATTERY PACK AND METHOD FOR PRODUCING BATTERY PACK

CROSS-REFERENCE TO RELATED APPLICATIONS

This application is a U.S. National stage application of International Application No. PCT/JP2015/079901, filed on Oct. 22, 2015.

BACKGROUND

Field of the Invention

The present invention relates to a battery pack in which a plurality of unit cells is stacked and a method of manufacturing the battery pack.

Background Information

Conventionally, there is a battery pack in which a plurality of unit cells is stacked (see Japanese Laid Open Patent Application No. 2012-515418, hereinafter referred to as Patent Document 1). The unit cells comprise electrode tabs to and from which electric power is input and output. The electrode tabs of the unit cells are electrically connected by means of a bus bar having electrical conductivity. The terminal member is connected to the bus bar and relays the charging and discharging of the unit cell.

SUMMARY

According to the configuration of Patent Document 1, since the bus bar and the electrode tab of each unit cell are integrally configured, design flexibility is low when connecting the terminal member to the bus bar, and it is difficult to connect the terminal member to the bus bar from all directions. Therefore, there are cases in which a need arises to carry out connection between a terminal member and a bus bar, and connection between an electrode tab and a bus bar in each unit cell, on different surfaces of the device. In such cases, the device becomes large, and the space required for welding the component members also increases.

An object of the present invention is to provide a battery pack capable of decreasing the device size, and a method of manufacturing a battery pack capable of reducing the space required for welding the component members.

The battery pack of the present invention for achieving the object described above comprises a cell group, a bus bar, and a terminal member. The cell group is obtained by stacking, in the thickness direction, a plurality of unit cells provided with a cell body, which includes a power generation element and is formed into a flat shape, and an electrode tab protruding out from the cell body, and the electrode tabs are arranged along the stacking direction. The bus bar is formed into a flat plate shape and joined to the electrode tabs of the unit cells, and it electrically connects the electrode tabs of at least two of the unit cells with each other. The terminal member is joined to the bus bar and relays the input and output of electric power in the cell group. Here, the battery pack is configured such that a terminal joining position where the terminal member is joined to the bus bar is disposed away from the joining position between the bus bar and the electrode tabs, when viewing the surface on which the electrode tabs are arranged in the cell group from a direction that is orthogonal to the surface.

In the manufacturing method of a battery pack of the present invention for achieving the object described above, a cell group, a bus bar, and a terminal member are welded. The cell group is obtained by stacking, in the thickness direction, a plurality of unit cells provided with a cell body, which includes a power generation element and is formed into a flat shape, and an electrode tab protruding out from the cell body, and the electrode tabs are arranged along the stacking direction. The bus bar is formed into a flat plate shape and joined to the electrode tabs of the unit cells, and it electrically connects the electrode tabs of at least two of the unit cells with each other. The terminal member is joined to the bus bar and relays the input and output of electric power in the cell group. Here, in the manufacturing method of a battery pack, a terminal joining position where the terminal member is joined to the bus bar is disposed away from the joining position between the bus bar and the electrode tabs, when viewing the surface on which the electrode tabs are arranged in the cell group from a direction that is orthogonal to the surface.

DETAILED DESCRIPTION OF EMBODIMENTS

Figure 1:
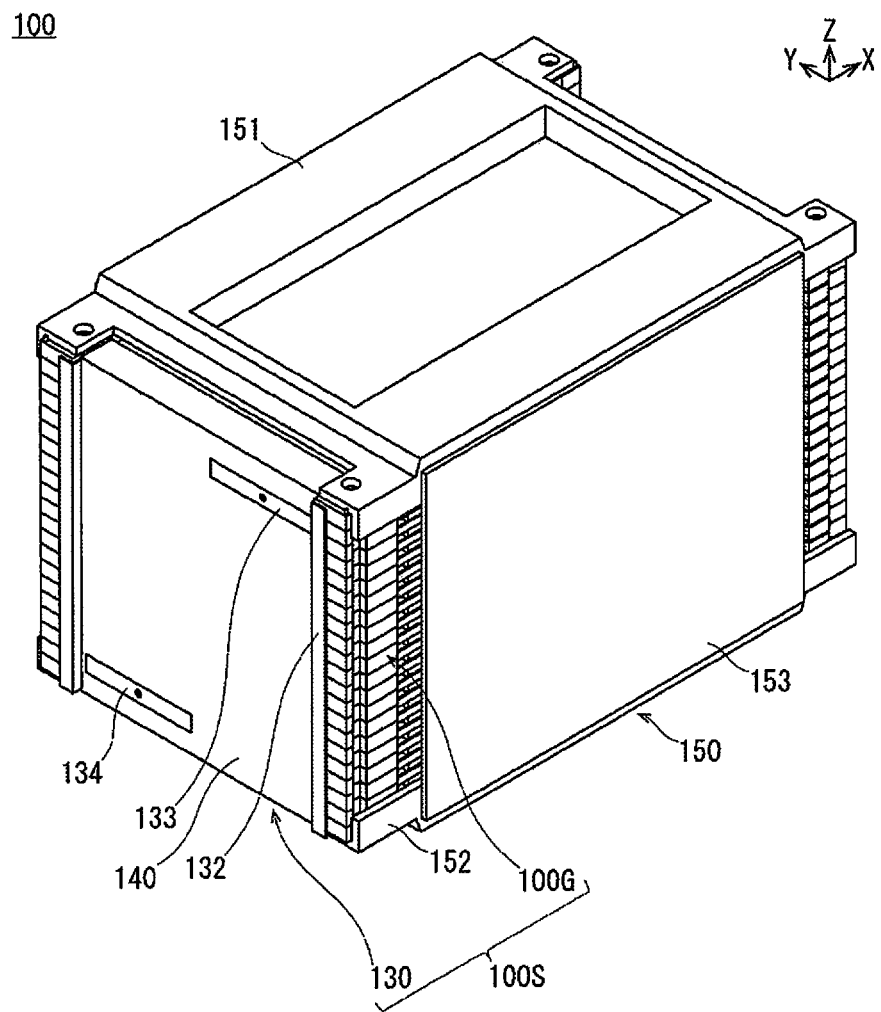
FIG. 1 is a perspective view illustrating the battery pack according to the embodiment.

Embodiments of the present invention will be explained below, with reference to the appended drawings. In the explanations of the drawings, the same elements are given the same reference symbols, and overlapping explanations are omitted. The sizes and ratios of the members in the drawing are exaggerated for convenience of explanation and may be different from the actual sizes and ratios. The orientation is shown using arrows indicated by X, Y, and Z in the drawings. The direction of the arrow indicated by X indicates a direction that intersects with the stacking direction of the unit cell 110 and a direction along the longitudinal direction of the unit cell 110. The direction of the arrow indicated by Y indicates a direction that intersects with the stacking direction of the unit cell 110 and a direction along the short side direction of the unit cell 110. The direction of the arrow indicated by Z is the stacking direction of the unit cell 110.

Embodiment

First, a battery pack 100 according to the embodiment will be described with reference to FIGS. 1-11.

Figure 2:
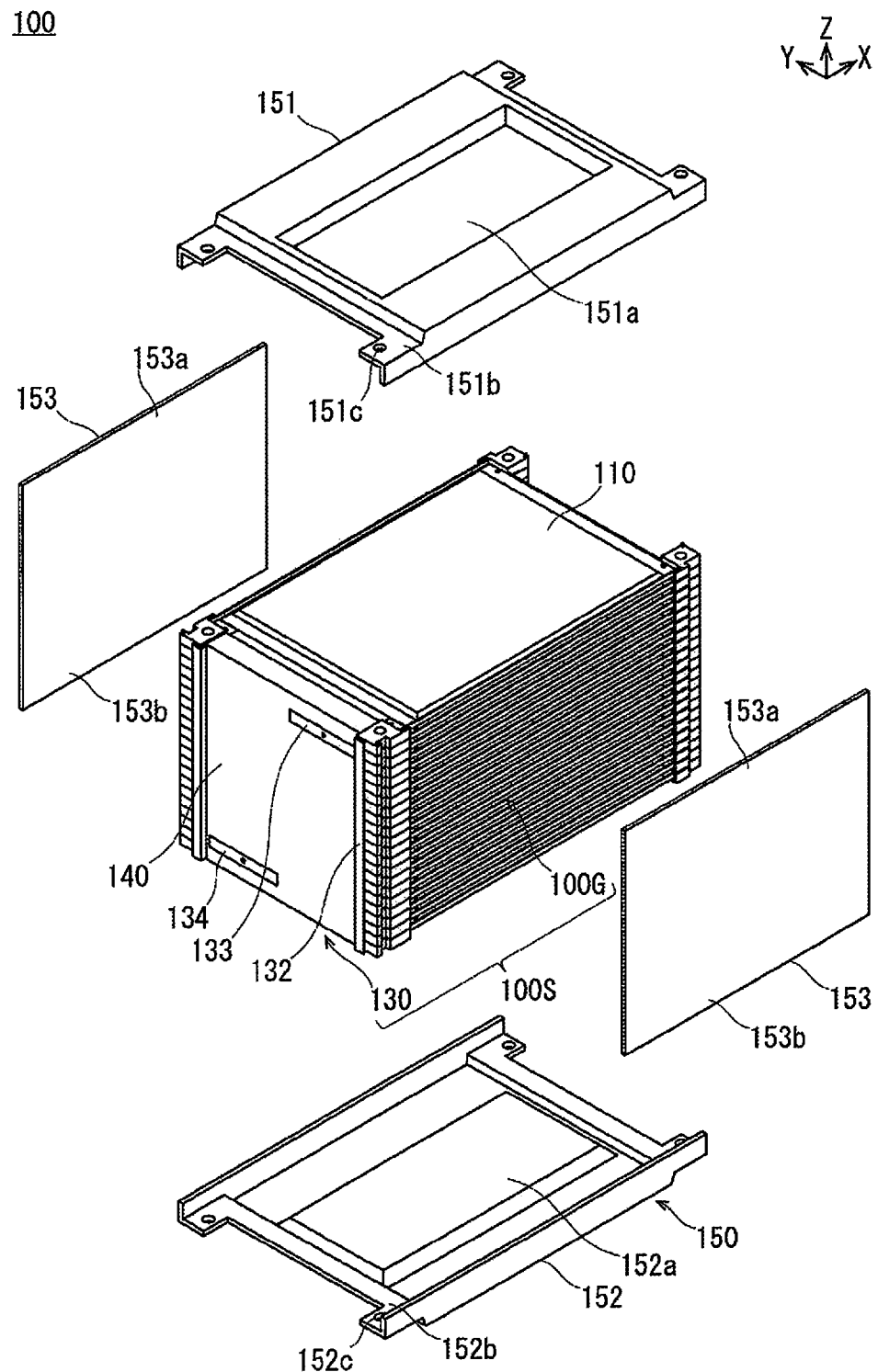
FIG. 2 is a perspective view illustrating a state in which the entire stacked body, in a state in which an upper pressure plate, a lower pressure plate, and left and right side plates are disassembled from the battery pack illustrated in FIG. 1 and a protective cover is attached thereto, is exposed.
Figure 3:
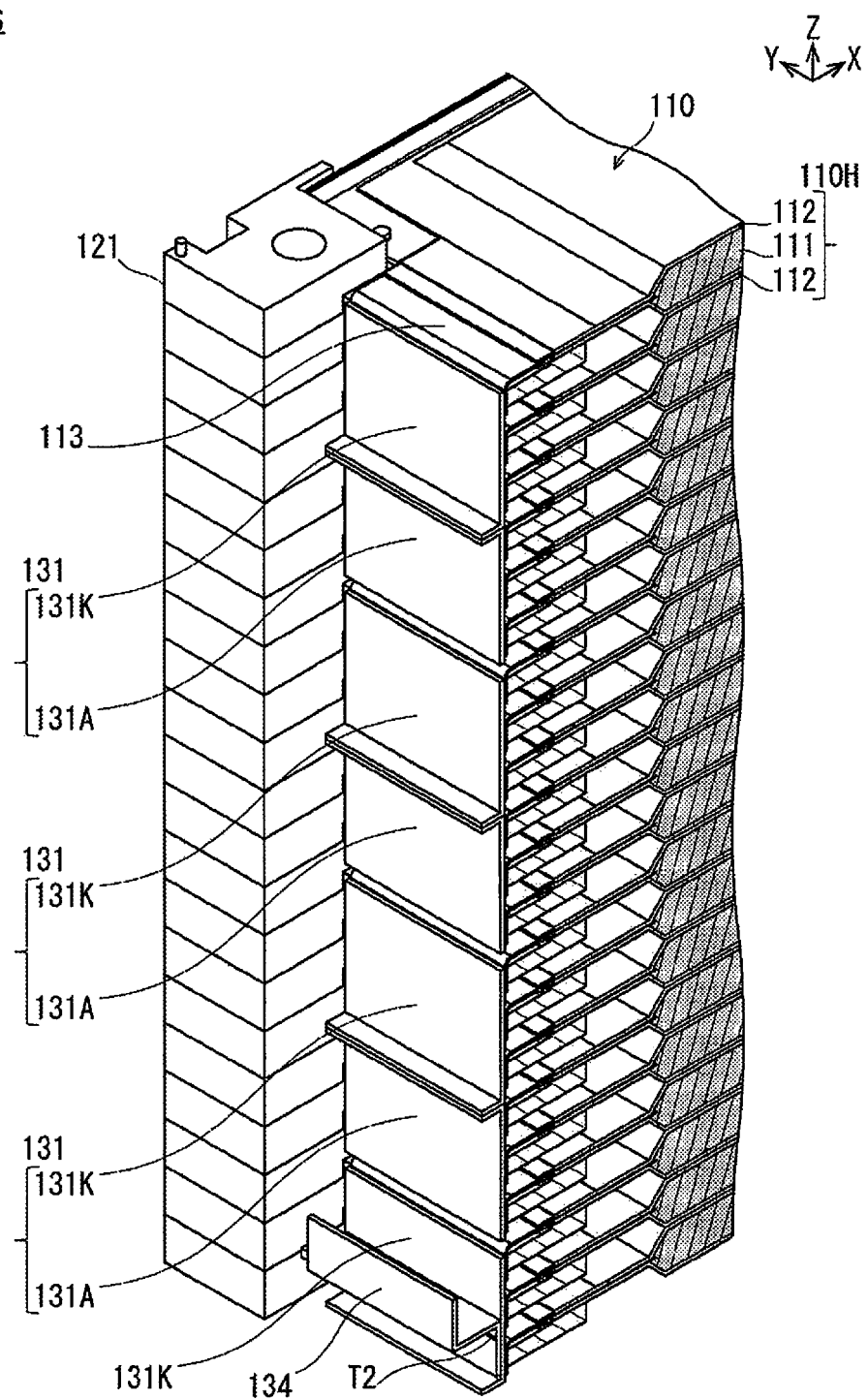
FIG. 3 is a perspective view illustrating the principle parts of the stacked body of FIG. 2 in cross-section.
Figure 4:
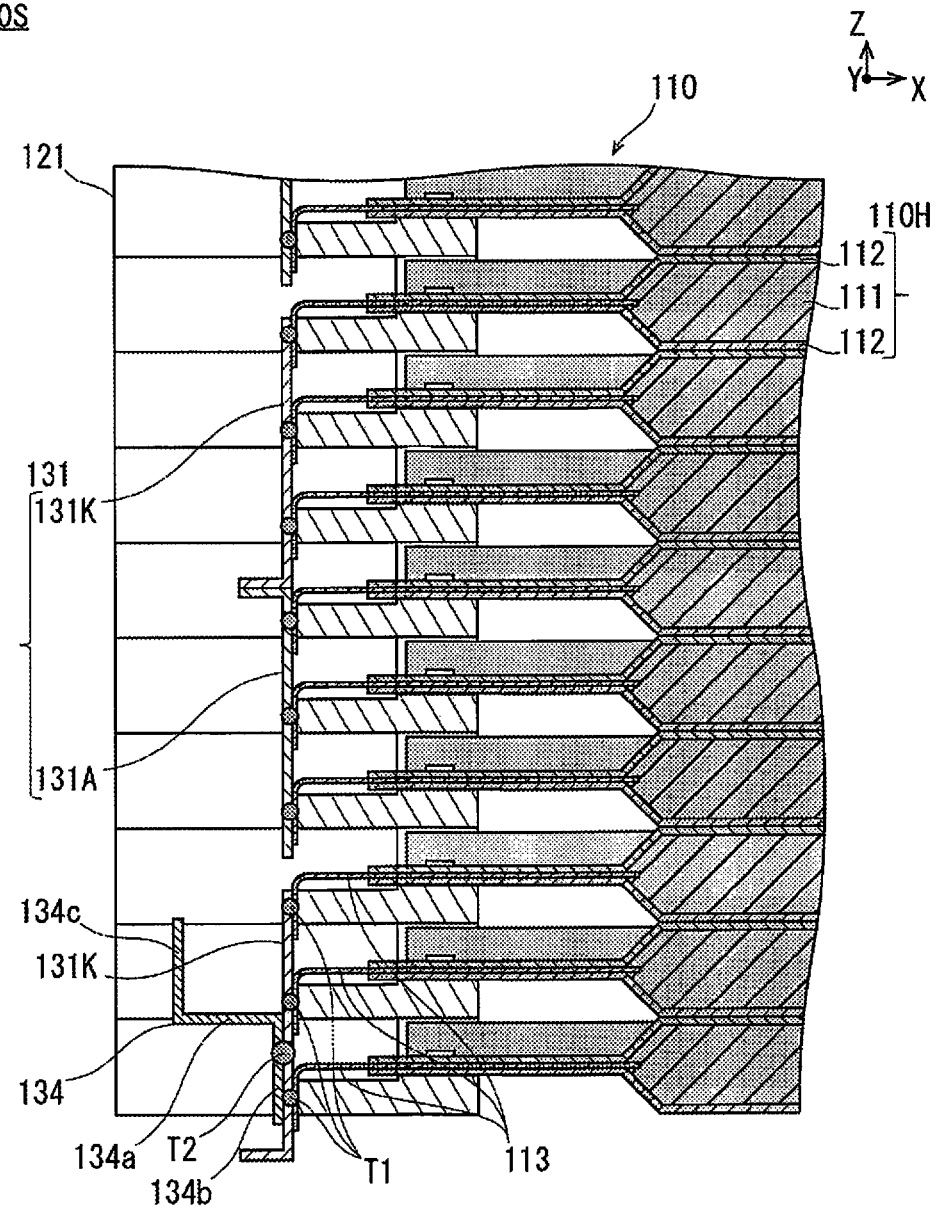
FIG. 4 is a side view illustrating the principle parts of the stacked body of FIG. 2 in cross-section.
Figure 5:
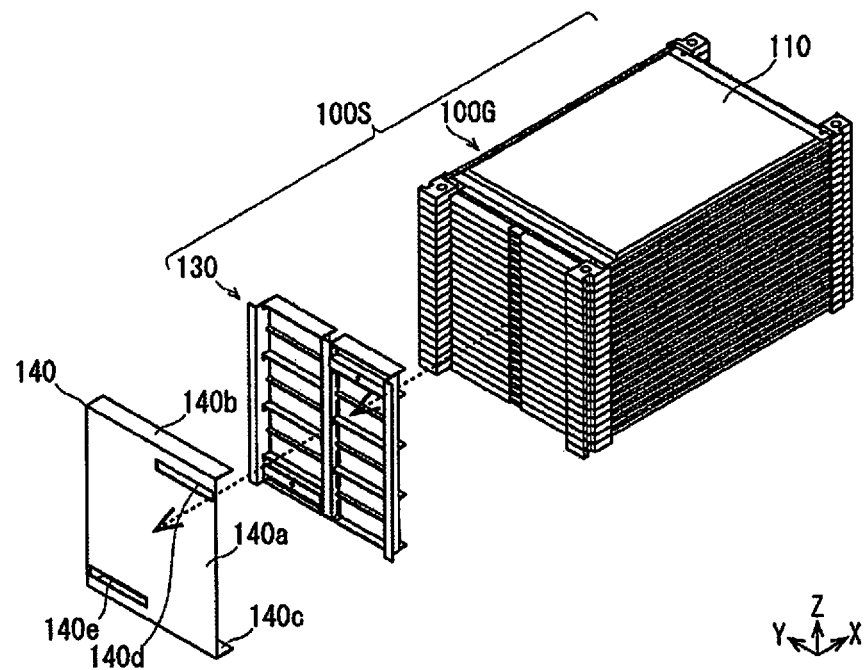
FIG. 5 is a perspective view illustrating a state in which the protective cover is detached from the stacked body illustrated in FIG. 2, and the stacked body is disassembled into a cell group and a bus bar unit.
Figure 6:
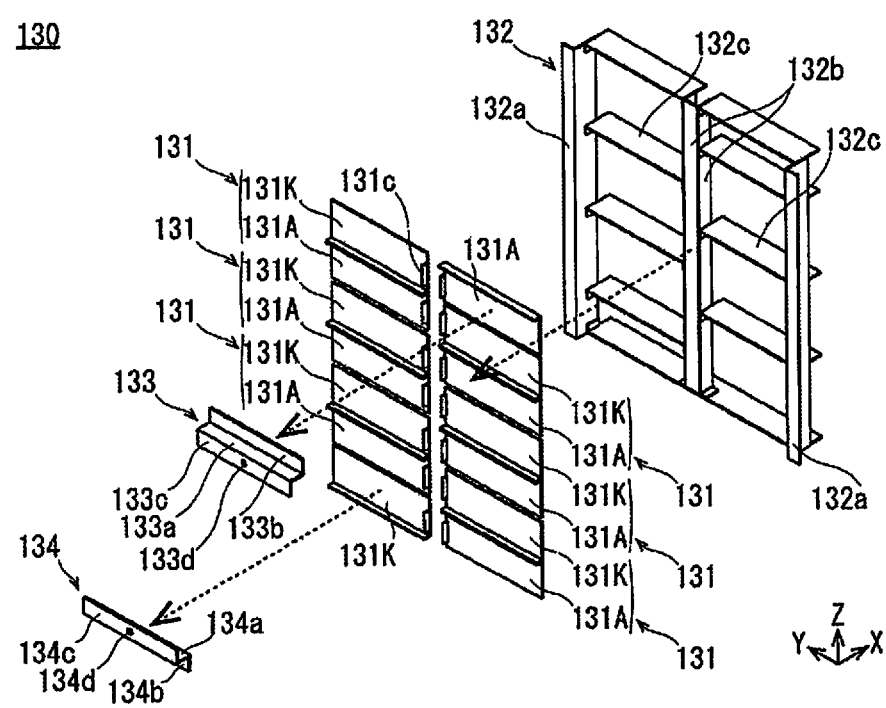
FIG. 6 is an exploded perspective view illustrating the bus bar unit illustrated in FIG. 5.
Figure 7:
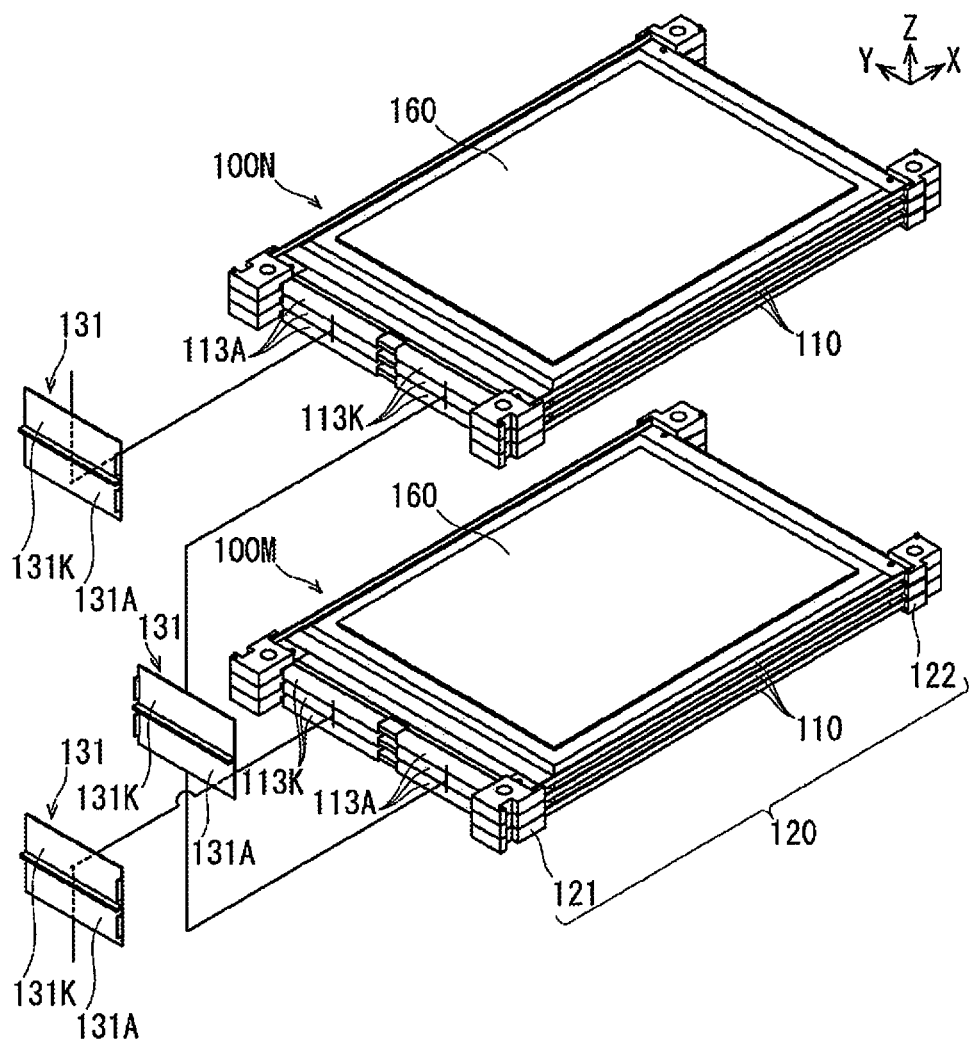
FIG. 7 is an exploded perspective view schematically illustrating a state in which an anode side electrode tab of a first cell sub-assembly (set of three unit cells connected in parallel) and a cathode side electrode tab of a second cell sub-assembly (set of three unit cells connected in parallel) are joined by means of a bus bar.
Figure 8A:
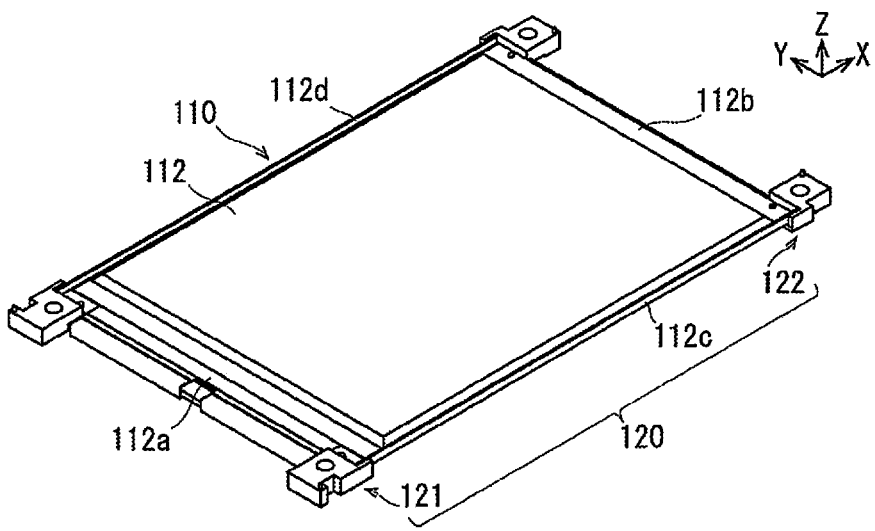
FIG. 8A is a perspective view illustrating a state in which a pair of spacers (first spacer and second spacer) is attached to a unit cell.
Figure 8B:
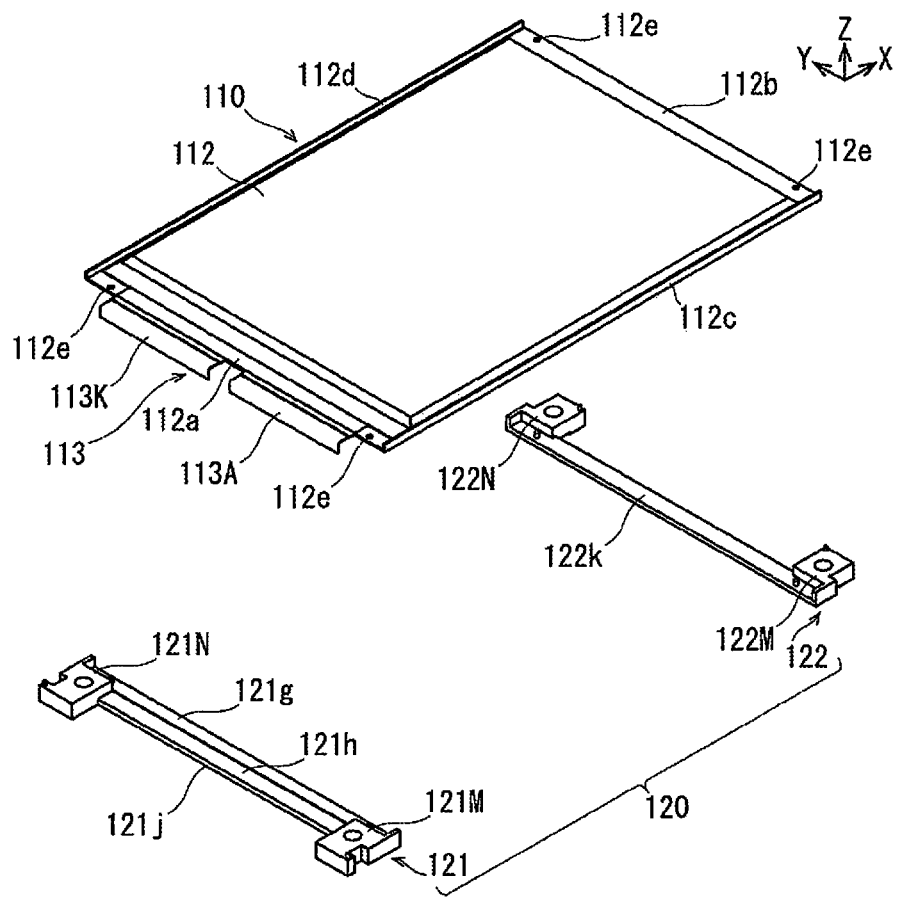
FIG. 8B is a perspective view illustrating a state before the pair of spacers (first spacer and second spacer) is attached to the unit cell.
Figure 9:
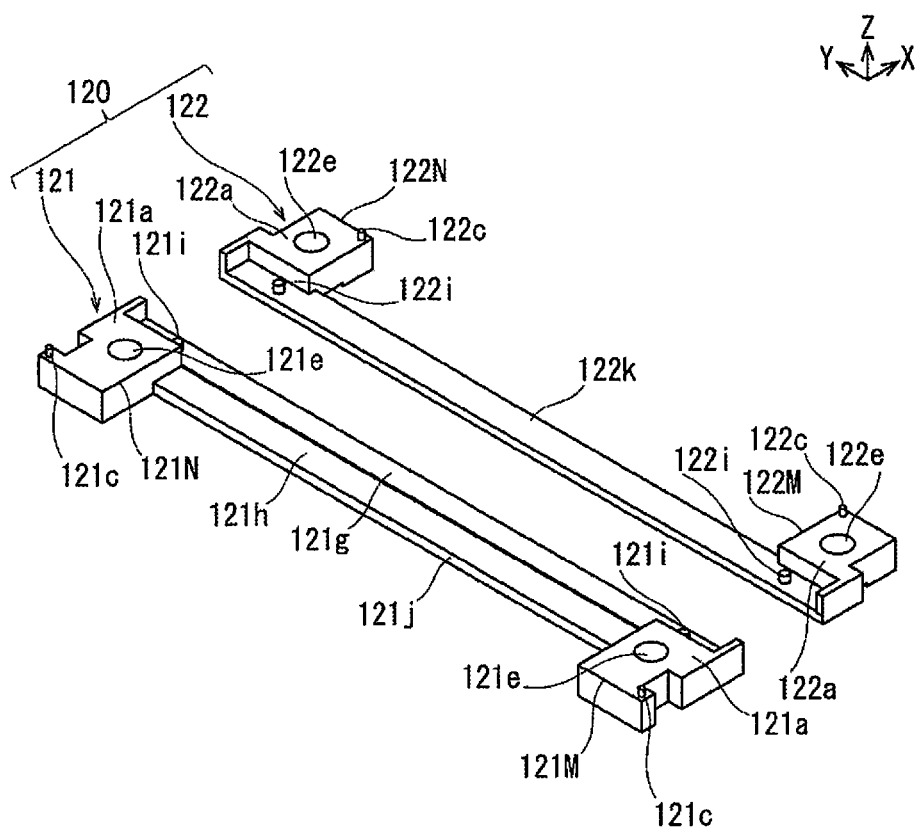
FIG. 9 is a perspective view illustrating the pair of spacers (first spacer and second spacer).
Figure 10A:
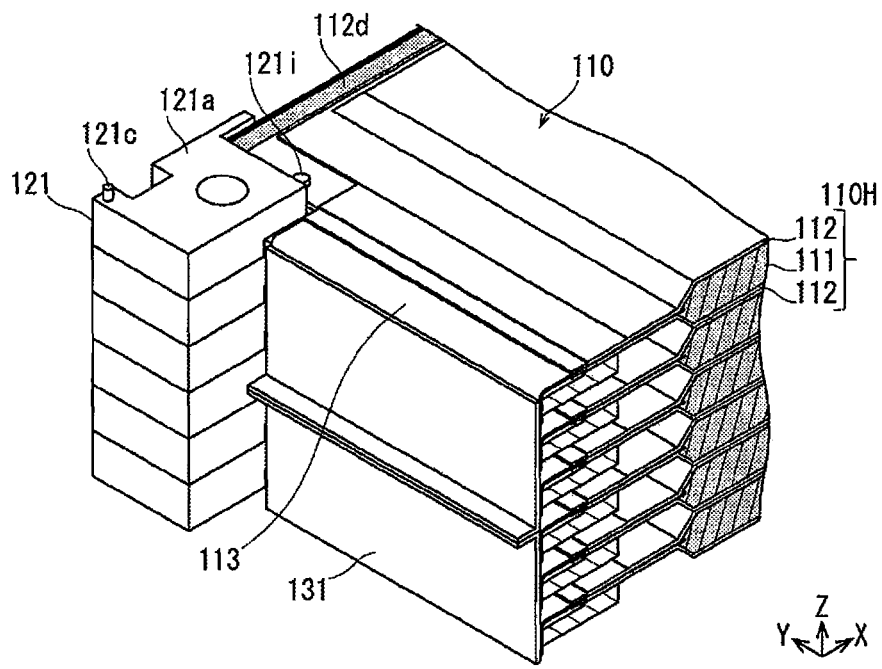
FIG. 10A is a perspective view illustrating a cross-section of the principle part of a state in which a bus bar is joined to the electrode tabs of stacked unit cells.
Figure 10B:
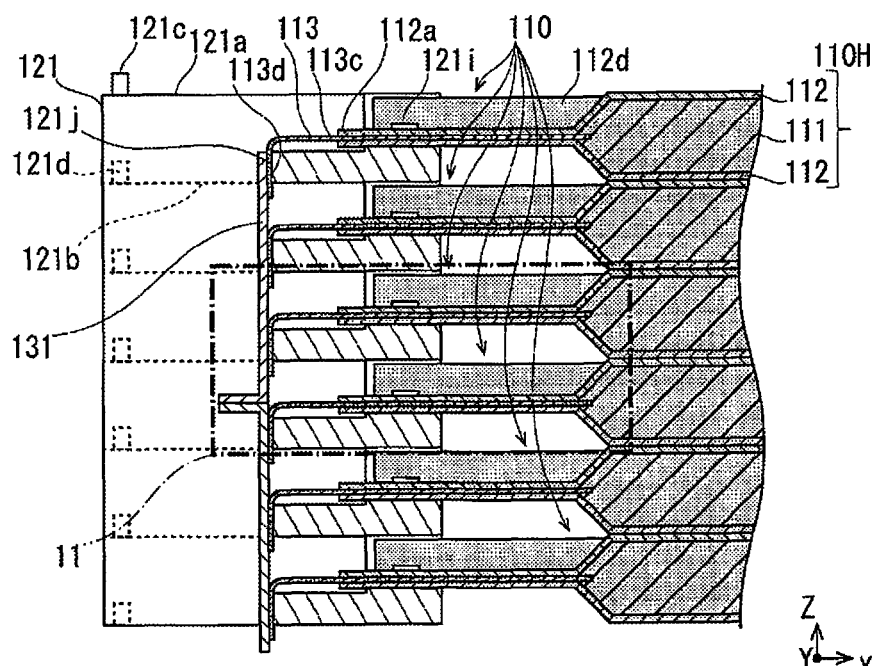
FIG. 10B is a side view illustrating FIG. 10A as viewed from the side.
Figure 11:
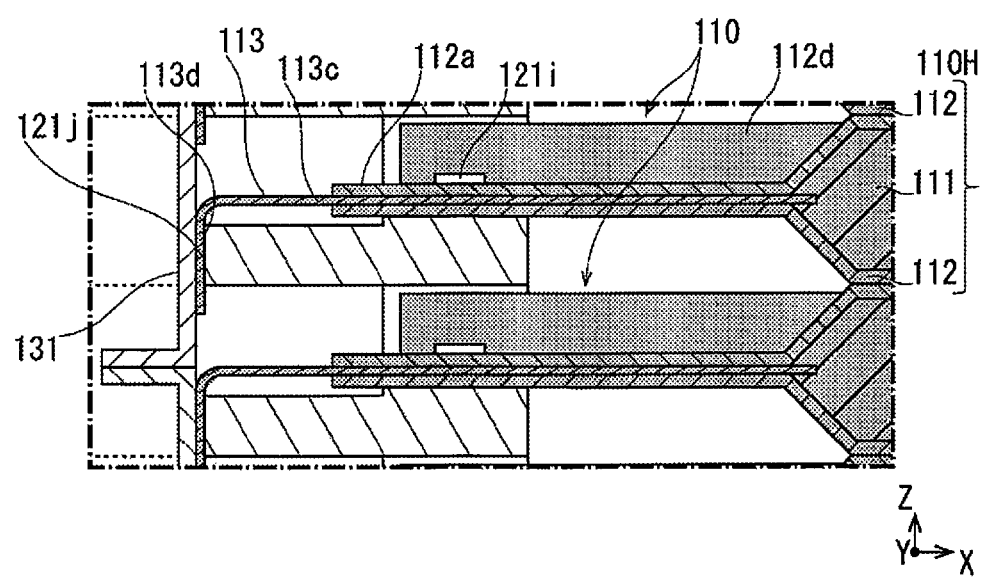
FIG. 11 is an enlarged side view of region 11 illustrated in FIG. 10B.

FIG. 1 is a perspective view illustrating the battery pack 100 according to the embodiment. FIG. 2 is a perspective view illustrating a state in which the entire stacked body 100S, in a state in which an upper pressure plate 151, a lower pressure plate 152, and left and right side plates 153 are disassembled from the battery pack 100 illustrated in FIG. 1 and a protective cover 140 is attached thereto, is exposed. FIG. 3 is a perspective view illustrating the principle parts of the stacked body 100S of FIG. 2 in cross-section. FIG. 4 is a side view illustrating the principle parts of the stacked body of FIG. 2 in cross-section. FIG. 5 is a perspective view illustrating a state in which the protective cover 140 is detached from the stacked body 100S illustrated in FIG. 2 and the stacked body 100S is disassembled into a cell group 100G and a bus bar unit 130. FIG. 6 is an exploded perspective view illustrating the bus bar unit 130 illustrated in FIG. 5. FIG. 7 is an exploded perspective view schematically illustrating a state in which an anode side electrode tab 113A of a first cell sub-assembly 100M (set of three unit cells 110 connected in parallel) and a cathode side electrode tab 113K of a second cell sub-assembly 100N (set of three unit cells 110 connected in parallel) are joined by means of a bus bar 131. FIG. 8A is a perspective view illustrating a state in which a pair of spacers 120 (first spacer 121 and second spacer 122) is attached to a unit cell 110, and FIG. 8B is a perspective view illustrating a state before the pair of spacers 120 (first spacer 121 and second spacer 122) is attached to the unit cell 110. FIG. 9 is a perspective view illustrating the pair of spacers 120 (first spacer 121 and second spacer 122). FIG. 10A is a perspective view illustrating a cross-section of the principle part of a state in which a bus bar 131 is joined to the electrode tabs 113 of stacked unit cells 110, and FIG. 10B is a side view illustrating FIG. 10A as viewed from the side. FIG. 11 is an enlarged side view of region 11 illustrated in FIG. 10B.

In the state illustrated in FIG. 1, the left front side is referred to as the "front side" of the entire battery pack 100 and of each component part, the right rear side is referred to as the "rear side" of the entire battery pack 100 and of each component part, and the right front side and the left rear side are referred to as the left and right "lateral sides" of the entire battery pack 100 and of each component part.

The battery pack 100 comprises a stacked body 100S including a cell group 100G formed by stacking a plurality of unit cells 110 having a flat shape in the thickness direction, as illustrated in FIG. 1 and FIG. 2. The battery pack 100 further comprises a protective cover 140 attached on the front side of the stacked body 100S, and a chassis 150 that houses the stacked body 100S in a state in which each unit cell 110 is pressurized along the stacking direction of the unit cells 110. The stacked body 100S comprises a cell group 100G, and a bus bar unit 130 attached to the front side of the cell group 100G that integrally holds a plurality of bus bars 131, as illustrated in FIG. 5. The protective cover 140 covers and protects the bus bar unit 130. The bus bar unit 130 comprises a plurality of bus bars 131 and a bus bar holder 132 that integrally attaches the plurality of bus bars 131 in a matrix, as illustrated in FIG. 6. Of the plurality of bus bars 131, an anode side terminal 133 is attached to the terminal end on the anode side, and a cathode side terminal 134 is attached to the terminal end on the cathode side.

The battery pack 100 of the embodiment generally comprises a cell group 100G, a bus bar 131, and a terminal member (anode side terminal 133 or cathode side terminal 134). The cell group 100G is obtained by stacking, in the thickness direction, a plurality of unit cells 110 provided with a cell body 110H, which includes a power generation element 111 and is formed into a flat shape, and an electrode tab 113 protruding out from the cell body 110H, and the electrode tabs 113 are arranged along the stacking direction. The bus bar 131 is formed into a flat plate shape and joined to the electrode tabs 113 of the unit cells 110, and it electrically connects the electrode tabs 113 of at least two of the unit cells 110 with each other. The terminal member (anode side terminal 133 or cathode side terminal 134) is joined to the bus bar 131 (anode side bus bar 131A or cathode side bus bar 131K) and relays the input and output of electric power in the cell group 100G. Here, the battery pack 100 is configured such that a terminal joining position (corresponding to the position of the second joining portion T2) where the terminal member (anode side terminal 133 or cathode side terminal 134) is joined to the bus bar 131 is disposed away from the joining position (corresponding to the position of the first joining portion T1) between the bus bar 131 and the electrode tabs 113, when viewing the surface on which the electrode tabs 113 are arranged in the cell group 100G from a direction that is orthogonal to the surface. The battery pack 100 of the embodiment will be described in detail below.

The cell group 100G is configured by connecting, in series, a first cell sub-assembly 100M comprising three unit cells 110 electrically connected in parallel and a second cell sub-assembly 100N comprising three different unit cells 110 electrically connected in parallel by means of a bus bar 131, as illustrated in FIG. 7.

The first cell sub-assembly 100M and the second cell sub-assembly 100N have the same configuration, excluding the folding directions of the distal end portions 113$d$ of the electrode tabs 113 of the unit cells 110. Specifically, the second cell sub-assembly 100N is one in which the top and bottom of the unit cells 110 included in the first cell sub-assembly 100M are reversed. However, the folding direction of the distal end portions 113$d$ of the electrode tabs 113 of the second cell sub-assembly 100N is aligned on the lower side of the stacking direction Z so as to be the same as the folding direction of the distal end portions 113$d$ of the electrode tabs 113 of the first cell sub-assembly 100M. A pair of spacers 120 (first spacer 121 and second spacer 122) is attached to each of the unit cells 110.

The unit cell 110 corresponds to, for example, a flat lithium ion secondary battery. The unit cell 110 comprises a cell body 110H obtained by sealing a power generation element 111 with a pair of laminate films 112 and a thin plate shaped electrode tab 113 that is electrically connected to the power generation element 111 and protruding out from the cell body 110H to the outside, as illustrated in FIG. 8 and FIG. 10.

The power generation element 111 is formed by stacking a plurality of layers in which a positive electrode and a negative electrode are sandwiched by separators. The power generation element 111 is charged by receiving a supply of electric power from the outside, then it supplies electric power to an external electrical device while discharging.

The laminate film 112 is configured by covering both sides of a metal foil with a sheet having an insulating property. The pair of laminate films 112 covers the power generation element 111 from both sides along the stacking direction Z to seal the four sides thereof. In the pair of laminate films 112, an anode side electrode tab 113A and a cathode side electrode tab 113K are protruding out from between end portions 112$a$ along the short side direction Y to the outside, as illustrated in FIG. 8.

In the laminate film 112, a pair of connecting pins 121$i$ of the first spacer 121 is respectively inserted into a pair of connecting holes 112$e$ respectively provided on both ends of the end portion 112$a$ along the short side direction Y, as illustrated in FIG. 8 and FIG. 9. On the other hand, in the laminate film 112, a pair of connecting pins 122$i$ is respectively inserted into a pair of connecting holes 112$e$ respectively provided on both ends of the other end portion 112$b$ along the short side direction Y. In the laminate film 112, two end portions 112$c$ and 112$d$ along the longitudinal direction X are formed bent upward in the stacking direction Z.

The electrode tab 113 is configured from an anode side electrode tab 113A and a cathode side electrode tab 113K, which respectively extend from between the end portion 112$a$ of a pair of laminate films 112 toward the outside, in a state of being separated from each other, as illustrated in FIGS. 8, 10, and 11. The anode side electrode tab 113A is made of aluminum, in accordance with the characteristics of the anode side component members in the power generation element 111. The cathode side electrode tab 113K is made of copper, in accordance with the characteristics of the cathode side component members in the power generation element 111.

The electrode tab 113 is formed in an L shape from a proximal end portion 113$c$ adjacent to the cell body 110H to the distal end portion 113$d$, as illustrated in FIG. 10 and FIG. 11. Specifically, the electrode tab 113 extends from the proximal end portion 113$c$ thereof along one side in the longitudinal direction X. On the other hand, the distal end portion 113$d$ of the electrode tab 113 is formed folded downward along the stacking direction Z. The shape of the distal end portion 113$d$ of the electrode tab 113 is not limited to an L shape. The distal end portion 113$d$ of the electrode tab 113 is formed into a planar shape so as to face the bus bar 131. The electrode tab 113 may be formed into a U shape by further extending the distal end portion 113$d$ and by folding the extended portion along the proximal end portion 113$c$ on the cell body 110H side. On the other hand, the proximal end portion 113$c$ of the electrode tab 113 may be formed into a wave shape or a curved shape.

In the plurality of stacked unit cells 110, the distal end portion 113$d$ of each electrode tab 113 is aligned and folded downward in the stacking direction Z, as illustrated in FIG. 7 and FIG. 10. Here, in the battery pack 100, three unit cells 110 electrically connected in parallel (first cell sub-assembly 100M) and three different unit cells 110 electrically connected in parallel (second cell sub-assembly 100N) are connected in series, as illustrated in FIG. 7. Therefore, the top and bottom of the unit cells 110 are interchanged every three unit cells 110, such that the positions of the anode side electrode tabs 113A and the cathode side electrode tabs 113K of the unit cells 110 crisscross along the stacking direction Z.

However, if the top and bottom are simply interchanged every three unit cells 110, the positions of the distal end portions 113$d$ of the electrode tabs 113 will differ in the vertical direction along the stacking direction Z; therefore, all of the distal end portions 113$d$ of the electrode tabs 113 of the unit cells 110 are adjusted and folded so that the positions thereof will be aligned.

In the first cell sub-assembly 100M illustrated in the lower part of FIG. 7, the anode side electrode tab 113A is disposed on the right side of the drawing and the cathode side electrode tab 113K is disposed on the left side of the drawing. On the other hand, in the second cell sub-assembly 100N illustrated in the upper part of FIG. 7, the cathode side electrode tab 113K is disposed on the right side of the drawing and the anode side electrode tab 113A is disposed on the left side of the drawing.

In this manner, even if the arrangement of the anode side electrode tab 113A and the cathode side electrode tab 113K is different, the distal end portion 113$d$ of the electrode tab 113 of the unit cell 110 is folded downward along the stacking direction Z. In addition, the distal end portions 113$d$ of the electrode tabs 113 are arranged on the same side of the stacked body 100S, as illustrated in FIG. 5. A double-sided tape 160 that is joined to a stacking member to be stacked above is adhered to the unit cells 110 positioned on the upper surfaces of the first cell sub-assembly 100M and the second cell sub-assembly 100N.

A pair of spacers 120 (first spacer 121 and second spacer 122) is disposed between stacked unit cells 110, as illustrated in FIGS. 5, 7, and 10. The first spacer 121 is disposed along one end portion 112a of the laminate film 112 where the electrode tab 113 of the unit cell 110 protrudes, as illustrated in FIG. 8. The second spacer 122 is disposed along the other end portion 112b of the laminate film 112, as illustrated in FIG. 8. The second spacer 122 has a configuration in which the shape of the first spacer 121 is simplified. A plurality of the unit cells 110 is stacked in the stacking direction Z, after attaching a pair of spacers 120 (first spacer 121 and second spacer 122) to each. The pair of spacers 120 (first spacer 121 and second spacer 122) is made of reinforced plastics having insulating properties. Below, after describing the configuration of the first spacer 121, the configuration of the second spacer 122 will be described while comparing with the configuration of the first spacer 121.

The first spacer 121 is formed into a rectangular parallelepiped shape and elongated along the short side direction Y as illustrated in FIG. 8 and FIG. 9. The first spacer 121 is provided with placing portions 121M and 121N on the two ends in the longitudinal direction thereof (short side direction Y).

When the first spacer 121 is stacked in a state of being attached to a unit cell 110, the upper surfaces 121a of the placing portions 121M and 121N of one first spacer 121 and the lower surfaces 121b of the placing portions 121M and 121N of another first spacer 121 disposed above the first spacer 121 come in contact, as illustrated in FIG. 10B.

In the first spacer 121, in order to relatively position the plurality of unit cells 110 to be stacked, a positioning pin 121c provided on the upper surface 121a of one first spacer 121 is fitted with a positioning hole 121d that is opened on the lower surface 121b of another first spacer 121 and that corresponds to the position of the positioning pin 121c, as illustrated in FIG. 9 and FIG. 10B.

In the first spacer 121, a locating hole 121e for inserting a bolt that connects a plurality of battery packs 100 to each other along the stacking direction Z is opened in each of the placing portions 121M and 121N along the stacking direction Z, as illustrated in FIG. 9.

The first spacer 121 is formed such that the region between the placing portions 121M and 121N is notched from the upper side of the stacking direction Z, as illustrated in FIG. 8B and FIG. 9. The notched portion is provided with a first supporting surface 121g and a second supporting surface 121h along the longitudinal direction of the first spacer 121 (short side direction Y of the unit cell 110). The first supporting surface 121g is formed higher along the stacking direction Z and positioned further on the unit cell 110 side than the second supporting surface 121h.

The first spacer 121 carries and supports the one end portion 112a of the laminate film 112, in which the electrode tab 113 is protruded, with the first supporting surface 121g, as illustrated in FIG. 8. The first spacer 121 is provided with a pair of connecting pins 121i protruding upward from both ends of the first supporting surface 121g.

The first spacer 121 is provided with a supporting portion 121j, which abuts the electrode tab 113 from the opposite side of the bus bar 131 and supports the distal end portion 113d of the electrode tab 113 of the unit cell 110, on the side surface adjacent to the second supporting surface 121h along the stacking direction Z, as illustrated in FIG. 10 and FIG. 11. The supporting portion 121j of the first spacer 121 sandwiches the distal end portion 113d of the electrode tab 113 together with the bus bar 131 such that the distal end portion 113d and the bus bar 131 are sufficiently abutting each other.

The second spacer 122 has a configuration in which the shape of the first spacer 121 is simplified, as illustrated in FIG. 8 and FIG. 9. The second spacer 122 corresponds to a configuration in which a portion of the first spacer 121 is removed along the short side direction Y of the unit cell 110. Specifically, the second spacer 122 is configured by replacing the second supporting surface 121h and the first supporting surface 121g of the first spacer 121 with a supporting surface 122k. Specifically, the second spacer 122 is provided with placing portions 122M and 122N, in the same manner as the first spacer 121. The second spacer 122 is provided with the supporting surface 122k in the portion where the region between the placing portions 122M and 122N is notched from the upper side of the stacking direction Z. The supporting surface 122k carries and supports the other end portion 112b of the laminate film 112. The second spacer 122 is provided with a positioning pin 122c, a positioning hole, a locating hole 122e, and a connecting pin 122i, in the same manner as the first spacer 121.

The bus bar unit 130 is integrally provided with a plurality of bus bars 131, as illustrated in FIG. 5 and FIG. 6. The bus bar 131 is made of a metal having electrical conductivity, and it electrically connects the distal end portions 113d of the electrode tabs 113 of different unit cells 110 to each other. The bus bar 131 is formed into a flat plate shape, and is erected along the stacking direction Z.

The bus bar 131 is integrally formed by joining an anode side bus bar 131A that is laser-welded to an anode side electrode tab 113A of one unit cell 110, and a cathode side bus bar 131K that is laser-welded to a cathode side electrode tab 113K of another unit cell 110 adjacent along the stacking direction Z.

The anode side bus bar 131A and the cathode side bus bar 131K have the same shape and are respectively formed into an L shape, as illustrated in FIG. 6 and FIG. 10. The anode side bus bar 131A and the cathode side bus bar 131K are superimposed with the top and bottom inverted. Specifically, the bus bar 131 is integrated by joining the folded portion of the end portion of the anode side bus bar 131A along the stacking direction Z, and the folded portion of the end portion of the cathode side bus bar 131K along the stacking direction Z. The anode side bus bar 131A and the cathode side bus bar 131K are provided with side portions 131c at the ends in the short side direction Y along the longitudinal direction X, as illustrated in FIG. 6. The side portions 131c are joined to the bus bar holder 132.

The anode side bus bar 131A is made of aluminum, in the same manner as the anode side electrode tab 113A. The cathode side bus bar 131K is made of copper, in the same manner as the cathode side electrode tab 113K. The anode side bus bar 131A and the cathode side bus bar 131K made of different metals are joined to each other by ultrasonic joining.

For example, if the battery pack 100 is configured by connecting, in series, a plurality of sets of three unit cells 110 connected in parallel, as illustrated in FIG. 7, the anode side bus bar 131A portion of the bus bar 131 is laser-welded to the anode side electrode tabs 113A of three unit cells 110 that are adjacent to each other along the stacking direction Z. In the same manner, the cathode side bus bar 131K portion of the bus bar 131 is laser-welded to the cathode side electrode tabs 113K of three unit cells 110 that are adjacent to each other along the stacking direction Z.

However, of the bus bars 131 arranged in a matrix shape, the bus bar 131 positioned on the upper right in the drawing in FIG. 5 and FIG. 6 corresponds to the anode side terminal ends of 21 unit cells 110 (3 parallel 7 series), and is configured from only an anode side bus bar 131A. This anode side bus bar 131A is laser-welded to the anode side electrode tabs 113A of the three uppermost unit cells 110 of the cell group 100G. In the same manner, of the bus bars 131 arranged in a matrix shape, the bus bar 131 positioned on the lower left in the drawing in FIG. 5 and FIG. 6 corresponds to the cathode side terminal ends of 21 unit cells 110 (3 parallel 7 series), and is configured from only a cathode side bus bar 131K. This cathode side bus bar 131K is laser-welded to the cathode side electrode tabs 113K of the three lowermost unit cells 110 of the cell group 100G.

The bus bar holder 132 integrally holds a plurality of bus bars 131 in a matrix so as to face the electrode tab 113 of each of a plurality of stacked unit cells 110, as illustrated in FIG. 6. The bus bar holder 132 is made of resin having insulating properties and is formed in a frame shape.

The bus bar holder 132 is respectively provided with a pair of columnar support portions 132a erected along the stacking direction Z, so as to be positioned on both sides of the longitudinal direction of the first spacer 121 that support the electrode tabs 113 of the unit cells 110, as illustrated in FIG. 6. The pair of columnar support portions 132a is fitted on the side surfaces of the placing portions 121M and 121N of the first spacer 121. The pair of columnar support portions 132a have an L shape when viewed along the stacking direction Z, and is formed in a plate shape extended along the stacking direction Z. The bus bar holder 132 is provided with a pair of auxiliary columnar support portions 132b at an interval, erected along the stacking direction Z so as to be positioned in the vicinity of the center of the first spacer 121 in the longitudinal direction. The pair of auxiliary columnar support portions 132b is formed in a plate shape extended along the stacking direction Z.

The bus bar holder 132 comprises insulating portions 132c that respectively protrude between adjacent bus bars 131 along the stacking direction Z, as illustrated in FIG. 6. The insulating portions 132c are formed in a plate shape extended along the short side direction Y. Each of the insulating portions 132c is provided horizontally between the columnar support portion 132a and the auxiliary columnar support portion 132b. The insulating portion 132c prevents discharge by insulating the space between bus bars 131 of the unit cells 110 that are adjacent to each other along the stacking direction Z.

The bus bar holder 132 may be configured by joining the columnar support portion 132a, the auxiliary columnar support portion 132b, and the insulating portion 132c, which are independently formed, or be configured by integrally molding the columnar support portion 132a, the auxiliary columnar support portion 132b, and the insulating portion 132c.

The anode side terminal 133 corresponds to the anode side terminal end of the cell group 100G configured by alternately stacking the first cell sub-assembly 100M and the second cell sub-assembly 100N, as illustrated in FIG. 5 and FIG. 6.

The anode side terminal 133 is joined to the anode side bus bar 131A positioned on the upper right in the drawing, from among the bus bars 131 arranged in a matrix, as illustrated in FIG. 5 and FIG. 6. The anode side terminal 133 is made of a metal plate having electrical conductivity and, when viewed along the short side direction Y, has a shape in which the one end portion 133b and the other end portion 133c are folded in different directions along the stacking direction Z with reference to the central portion 133a. The one end portion 133b is laser-welded to the anode side bus bar 131A. An external input/output terminal is connected to a hole 133d (including the screw groove) opened in the center of the other end portion 133c.

The cathode side terminal 134 corresponds to the cathode side terminal end of the cell group 100G configured by alternately stacking the first cell sub-assembly 100M and the second cell sub-assembly 100N, as illustrated in FIG. 5 and FIG. 6. The cathode side terminal 134 is joined to the cathode side bus bar 131K positioned on the lower left in the drawing, from among the bus bars 131 arranged in a matrix, as illustrated in FIG. 5 and FIG. 6. The cathode side terminal 134 is configured in the same manner as the anode side terminal 133.

Here, the first joining portion T1 between the electrode tab 113 and the bus bar 131, and the second joining portion T2 between the cathode side bus bar 131K and the cathode side terminal 134, are provided at different positions, as illustrated in FIG. 4. The first joining portion T1 and the second joining portion T2 are formed by, for example, spot welding, and respectively extend linearly along the short side direction Y.

The protective cover 140 prevents the bus bars 131 from short-circuiting with each other and from coming in contact with an external member and being short-circuited or causing electrical leakage, by covering the bus bar unit 130, as illustrated in FIGS. 1-5. Furthermore, the protective cover 140 exposes the anode side terminal 133 and the cathode side terminal 134 to the outside and causes the power generation element 111 of each unit cell 110 to charge and discharge. The protective cover 140 is made of plastics having insulating properties.

The protective cover 140 is formed in a flat plate shape and is erected along the stacking direction Z, as illustrated in FIG. 5. The protective cover 140 has a shape in which the upper end 140b and the lower end 140c of the side surface 140a thereof are folded along the longitudinal direction X, and it is fitted to the bus bar unit 130.

The side surface 140a of the protective cover 140 is provided with a first opening 140d formed of a rectangular hole that is slightly larger than the anode side terminal 133, in a position that corresponds to the anode side terminal 133 provided on the bus bar unit 130, as illustrated in FIG. 2 and FIG. 5. In the same manner, the side surface 140a of the protective cover 140 is provided with a second opening 140e formed of a rectangular hole that is slightly larger than the cathode side terminal 134, in a position that corresponds to the cathode side terminal 134 provided on the bus bar unit 130.

The chassis 150 houses the cell group 100G in a state of being pressurized along the stacking direction, as illustrated in FIG. 1 and FIG. 2. An appropriate surface pressure is imparted to the power generation element 111 by sandwiching and pressurizing the power generation element 111 of each unit cell 110 provided to the cell group 100G with the upper pressure plate 151 and the lower pressure plate 152.

The upper pressure plate 151 is disposed above the cell group 100G along the stacking direction Z, as illustrated in FIG. 1 and FIG. 2. The upper pressure plate 151 is provided with a pressing surface 151a protruding downward along the stacking direction Z in the center thereof. The power generation element 111 of each unit cell 110 is pressed downward by the pressing surface 151a. The upper pressure plate 151 is provided with a holding portion 151b extended along the longitudinal direction X from both sides along the short side direction Y. The holding portion 151b covers the placing portions 121M and 121N of the first spacer 121 or the placing portions 122M and 122N of the second spacer 122. A locating hole 151c, which communicates with the positioning hole 121d of the first spacer 121 or the positioning hole 122d of the second spacer 122 along the stacking direction Z, is opened in the center of the holding portion 151b. A bolt that connects battery packs 100 with each other is inserted into the locating hole 151c. The upper pressure plate 151 is made of a metal plate having a sufficient thickness.

The lower pressure plate 152 has the same configuration as the upper pressure plate 151 and is formed by reversing the top and bottom of the upper pressure plate 151, as illustrated in FIG. 1 and FIG. 2. The lower pressure plate 152 is disposed below the cell group 100G along the stacking direction Z. The lower pressure plate 152 presses the power generation element 111 of each unit cell 110 upward with the pressing surface 151a protruding upward along the stacking direction Z.

One pair of side plates 153 fixes the relative positions of the upper pressure plate 151 and the lower pressure plate 152 such that the upper pressure plate 151 and the lower pressure plate 152, which sandwich and press the cell group 100G from above and below in the stacking direction Z, are not separated from each other, as illustrated in FIG. 1 and FIG. 2. The side plate 153 is made of a rectangular metal plate and is erected along the stacking direction Z. One pair of side plates 153 is joined to the upper pressure plate 151 and the lower pressure plate 152 from both sides in the short side direction Y of the cell group 100G by laser welding. Each side plate 153 is subjected to seam welding or spot welding at the upper end 153a portion that abuts the upper pressure plate 151 along the longitudinal direction X. In the same manner, each side plate 153 is subjected to seam welding or spot welding at the lower end 153b portion that abuts the lower pressure plate 152 along the longitudinal direction X. The pair of side plates 153 covers and protects both sides of the cell group 100G in the short side direction Y.

Next, the manufacturing method of the battery pack 100 will be described, with reference to FIGS. 12-20.

The manufacturing method (manufacturing steps) of the battery pack 100 comprises a stacking step (FIG. 12) for stacking the members configuring the battery pack 100, a pressurizing step (FIG. 13) for pressurizing the cell group 100G of the battery pack 100, a first joining step (FIG. 14) for joining the side plates 153 to the upper pressure plate 151 and the lower pressure plate 152, a second joining step (FIGS. 15-19) for joining the bus, bar 131 to the electrode tab 113 of the unit cell 110 and joining the terminal to the bus bar 131, and a mounting step (FIG. 20) for attaching the protective cover 140 to the bus bar 131.

The stacking step for stacking the members configuring the battery pack 100 will be described, with reference to FIG. 12.

Figure 12:
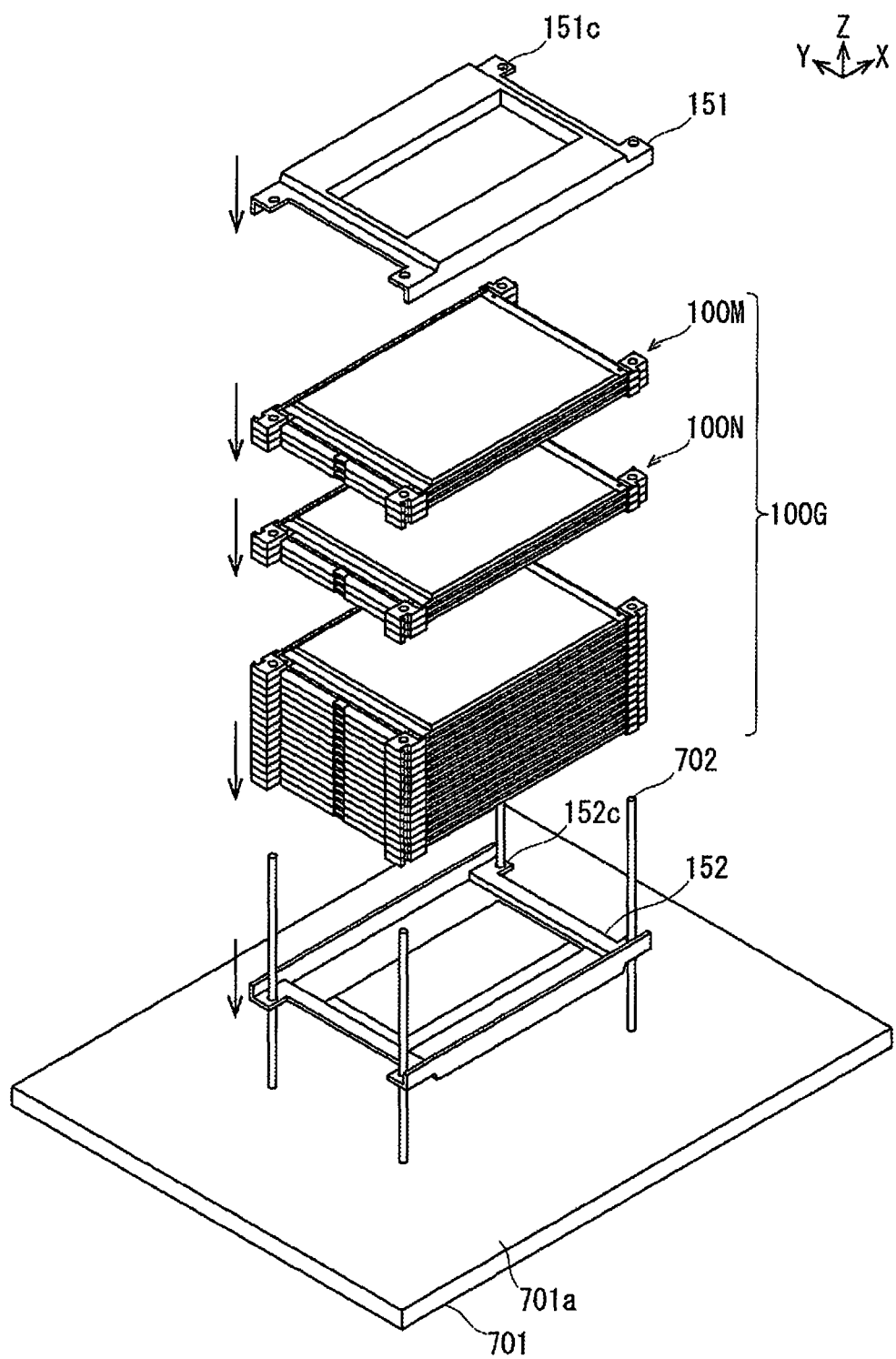
FIG. 12 is a view illustrating the battery pack manufacturing method according to the embodiment, and a perspective view schematically illustrating a state in which members constituting a battery pack are sequentially stacked on a mounting table.

FIG. 12 is a view illustrating the battery pack 100 manufacturing method according to the embodiment, and a perspective view schematically illustrating a state in which members constituting the battery pack 100 are sequentially stacked on a mounting table 701.

The mounting table 701 used for the stacking step is formed in a plate shape and is provided along a horizontal plane. The mounting table 701 comprises locating pins 702 for positioning the relative positions of the lower pressure plate 152, the first cell sub-assembly 100M, the second cell sub-assembly 100N, and the upper pressure plate 151, which are sequentially stacked, along the longitudinal direction X and the short side direction Y. Four locating pins 702 are erected on the upper surface 701a of the mounting table 701 with predetermined intervals therebetween. The intervals between the four locating pins 702 from each other correspond, for example, to the intervals between the locating holes 152c provided on the four corners of the upper pressure plate 151. The members constituting the battery pack 100 are stacked using a robot arm, a hand lifter, a vacuum adsorption type collet, or the like.

In the stacking step, the lower pressure plate 152 is lowered along the stacking direction Z and mounted on the upper surface 701a of the mounting table 701, in a state in which the locating holes 152c provided on the four corners thereof are inserted into the locating pins 702 by means of a robot arm, as illustrated in FIG. 12. Next, the first cell sub-assembly 100M is lowered along the stacking direction Z and mounted on the lower pressure plate 152, in a state in which the locating holes provided on the first spacer 121 and the second spacer 122, which are component members thereof, are inserted into the locating pins 702 by means of a robot arm. In the same manner, three sets each of the second cell sub-assembly 100N and the first cell sub-assembly 100M are alternately stacked by means of the robot arm. A double-sided tape 160 that is joined with a stacking member to be stacked above is adhered to the upper surfaces of the first cell sub-assembly 100M and the second cell sub-assembly 100N. Then, the upper pressure plate 151 is lowered along the stacking direction Z and stacked on the first cell sub-assembly 100M, in a state in which the locating holes 151c provided on the four corners thereof are inserted into the locating pins 702 by means of a robot arm.

The pressurizing step for pressurizing the cell group 100G of the battery pack 100 will be described with reference to FIG. 13.

Figure 13:
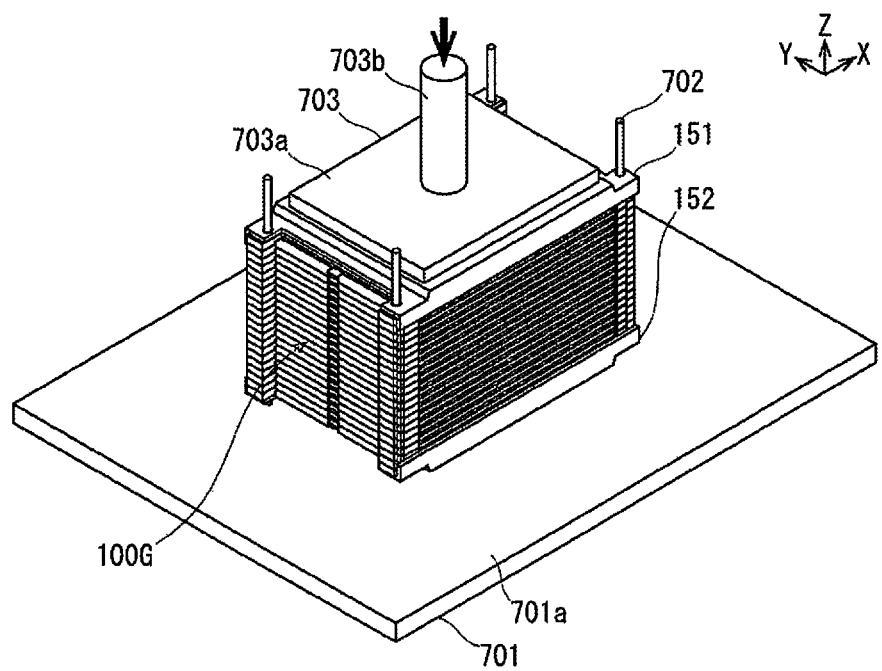
FIG. 13 is a perspective view schematically illustrating a state in which the component members of a battery pack are pressed from above, following FIG. 12.

FIG. 13 is a perspective view schematically illustrating a state in which the component members of a battery pack 100 are pressed from above, following FIG. 12.

A pressurizing jig 703 used in the pressurizing step comprises a pressurizing portion 703a that is formed in a plate shape and provided along a horizontal plane, and a supporting portion 703b that is formed in a cylindrical shape and erected and joined to the upper surface of the pressurizing portion 703a. The supporting portion 703b connects a hydraulic cylinder and an electric stage that are driven along the stacking direction Z. The pressurizing portion 703a moves above and below along the stacking direction Z via the supporting portion 703b. The pressurizing portion 703a pressurizes the abutted stacking members.

In the pressurizing step, the pressurizing portion 703a of the pressurizing jig 703 is lowered downward along the stacking direction Z while being abutted on the upper pressure plate 151 by the electric stage connected to the supporting portion 703b being driven, as illustrated in FIG. 13. The cell group 100G is sandwiched and pressurized by the upper pressure plate 151 that is pressed downward and the lower pressure plate 152 that is mounted on the mounting table 701. An appropriate surface pressure is imparted to the power generation element 111 of each unit cell 110 provided to the cell group 100G. The pressurizing step is continued until the next first joining step is completed.

The first joining step in which the side plates 153 are joined to the upper pressure plate 151 and the lower pressure plate 152 will be described with reference to FIG. 14.

Figure 14:
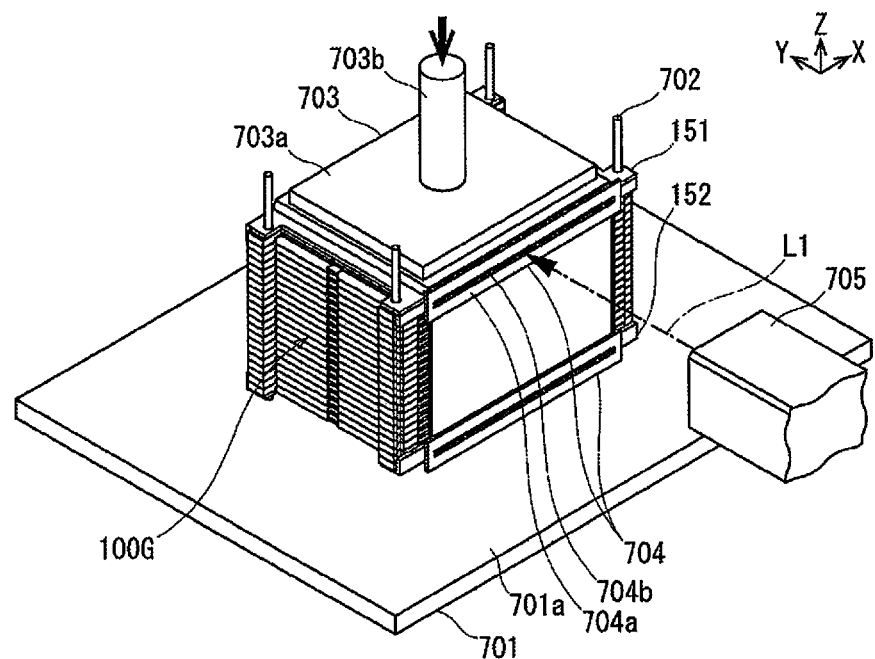
FIG. 14 is a perspective view schematically illustrating a state in which a side plate is laser-welded to an upper pressure plate and a lower pressure plate, following FIG. 13.

FIG. 14 is a perspective view schematically illustrating a state in which the side plates 153 are laser-welded to the upper pressure plate 151 and the lower pressure plate 152, following FIG. 13.

A pushing plate 704 used in the first joining step respectively presses the side plates 153 against the upper pressure plate 151 and the lower pressure plate 152, to respectively bring the side plates 153 in close contact with the upper pressure plate 151 and the lower pressure plate 152. The pushing plate 704 is made of metal and formed in an elongated plate shape. A linear slit 704b is opened in a main body 704a of the pushing plate 704 along the longitudinal direction. The short side direction of the pushing plate 704 is erected along the stacking direction Z. The pushing plate 704 presses the side plate 153 with the main body 704a and allows laser light L1 for welding to pass through the slit 704b.

A laser oscillator 705 is a light source for joining the side plates 153 to the upper pressure plate 151 and the lower pressure plate 152. The laser oscillator 705 is configured from, for example, a YAG (yttrium aluminum garnet) laser. The laser light L1 that is led out from the laser oscillator 705 is irradiated onto the upper end 153a and the lower end 153b of the side plate 153, in a state in which the light path is adjusted by means of, for example, an optical fiber or a mirror, and condensed by means of a condenser lens. The laser light L1 that is led out from the laser oscillator 705 may be split by means of a half-mirror and irradiated onto the upper end 153a and the lower end 153b of the side plate 153 at the same time.

In the first joining step, a laser oscillator 705 horizontally scans laser light L1 onto the upper end 153a of the side plate 153 that is pressed by means of the pushing plate 704 via the slit 704b of the pushing plate 704, and subjects the side plate 153 and the upper pressure plate 151 to seam welding at a plurality of locations, as illustrated in FIG. 14. In the same manner, the laser oscillator 705 horizontally scans laser light L1 onto the lower end 153b of the side plate 153 that is pressed by means of the pushing plate 704 via the slit 704b of the pushing plate 704, and subjects the side plate 153 and the lower pressure plate 152 to seam welding at a plurality of locations.

The second joining step in which the bus bar 131 is joined to the electrode tabs 113 of the unit cell 110 and the terminal is joined to the bus bar 131 will be described with reference to FIGS. 15-19.

Figure 15:
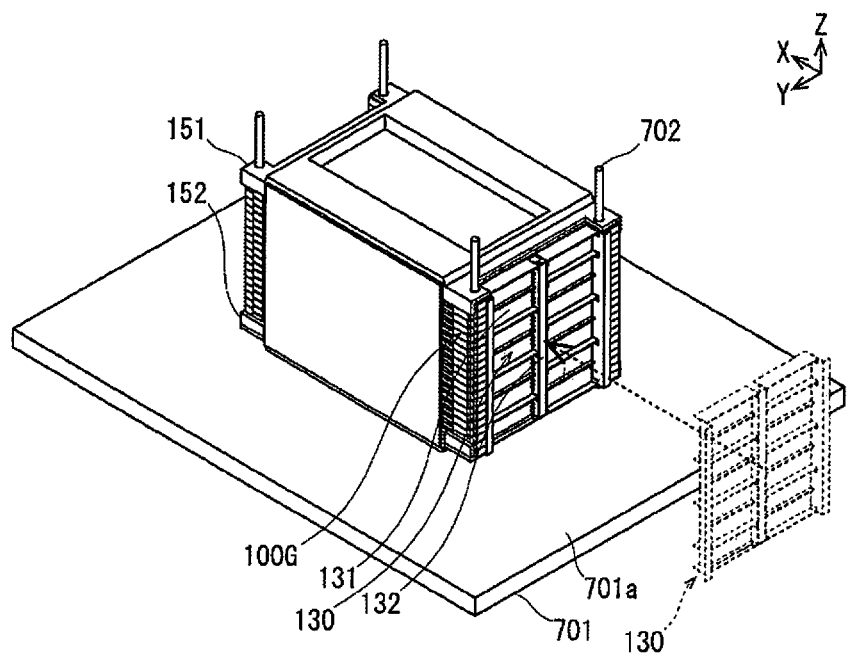
FIG. 15 is a perspective view schematically illustrating a state in which a part of the members of the bus bar unit is attached to the cell group, following FIG. 14.
Figure 16:
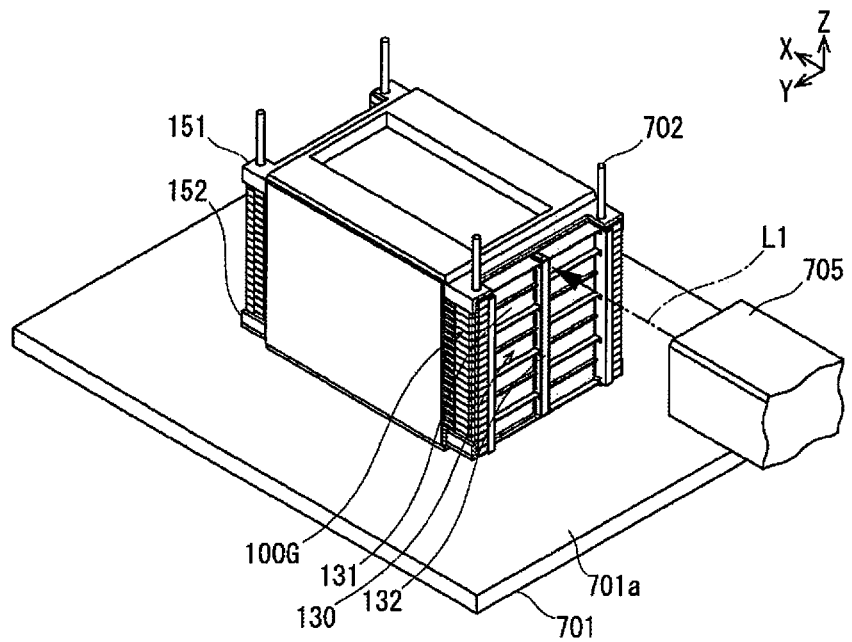
FIG. 16 is a perspective view schematically illustrating a state in which the bus bar of the bus bar unit is laser-welded to the electrode tabs of the unit cell, following FIG. 15.
Figure 17:
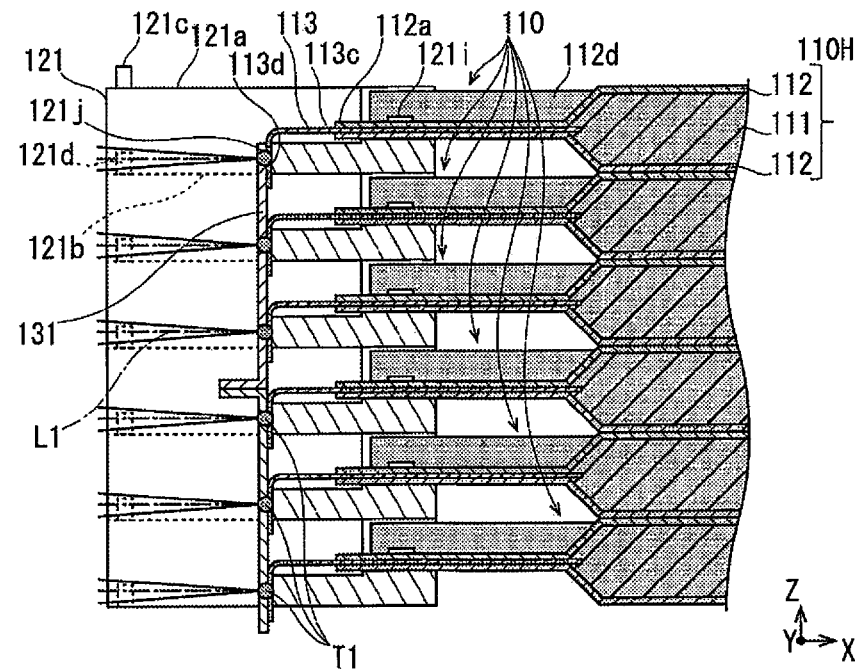
FIG. 17 is a side view illustrating a cross-section of the principle part of a state in which the bus bar is laser-welded to the electrode tabs of the stacked unit cells.
Figure 18:
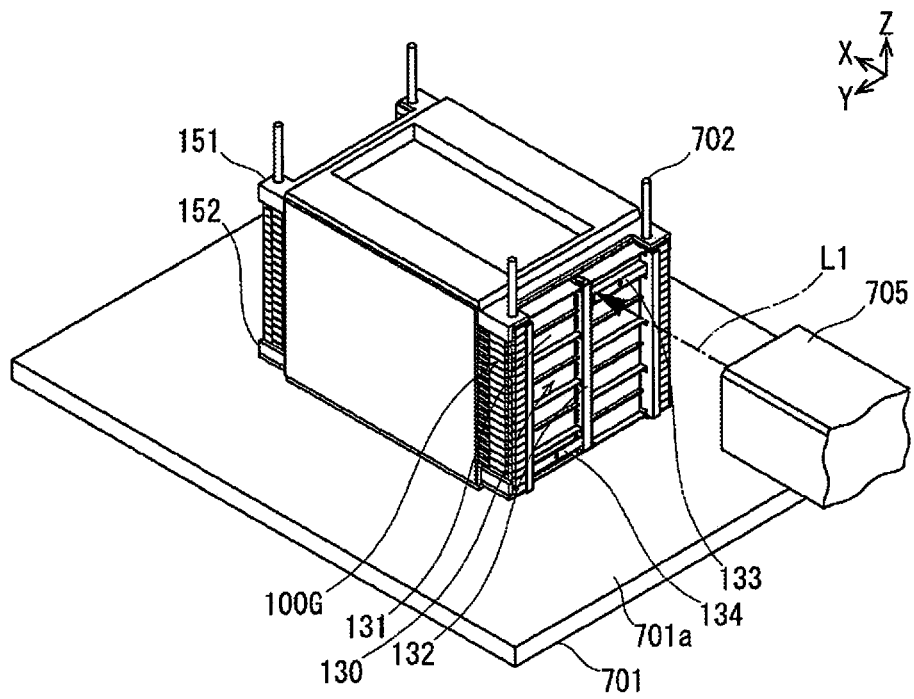
FIG. 18 is a perspective view schematically illustrating a state in which an anode side terminal and a cathode side terminal are laser-welded to an anode side bus bar and a cathode side bus bar, following FIG. 16 and FIG. 17.
Figure 19:
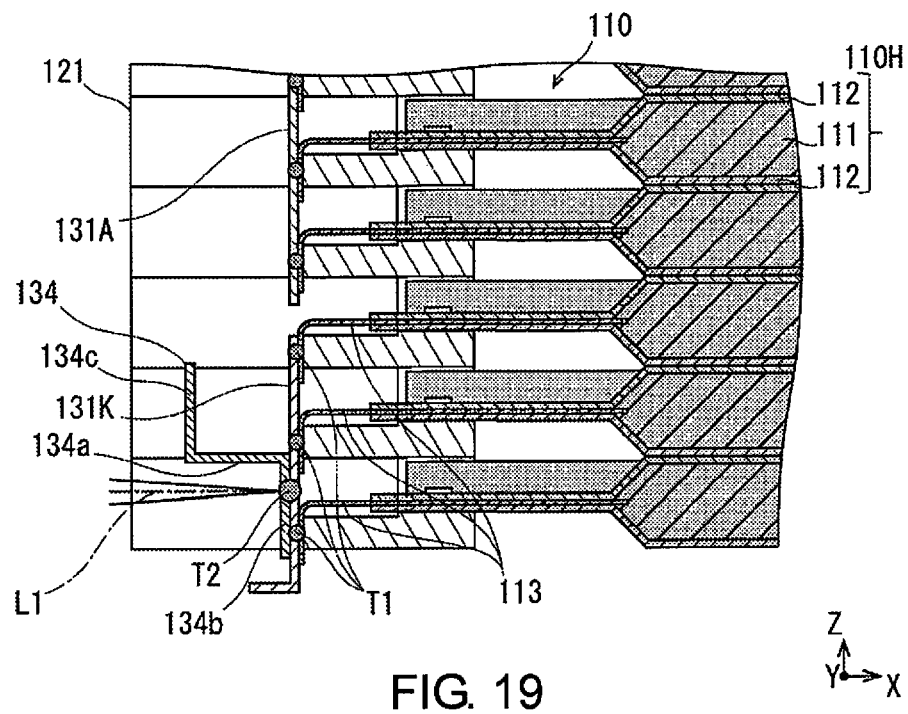
FIG. 19 is a side view illustrating a cross-section of the principle part of a state in which the cathode side terminal is laser-welded to the cathode side bus bar.

FIG. 15 is a perspective view schematically illustrating a state in which a part of the members of the bus bar unit 130 is attached to the cell group 100G, following FIG. 14. FIG. 16 is a perspective view schematically illustrating a state in which the bus bar 131 of the bus bar unit 130 is laser-welded to the electrode tabs 113 of the unit cell 110, following FIG. 15. FIG. 17 is a side view illustrating a cross-section of the principle part of a state in which the bus bar 131 is laser-welded to the electrode tabs 113 of the stacked unit cells 110. FIG. 18 is a perspective view schematically illustrating a state in which an anode side terminal 133 and a cathode side terminal 134 are laser-welded to an anode side bus bar 131A and a cathode side bus bar 131K, following FIG. 16 and FIG. 17. FIG. 19 is a side view illustrating a cross-section of the principle part of a state in which the cathode side terminal 134 is laser-welded to the cathode side bus bar 131K.

In the second joining step, the mounting table 701 rotates 90 degrees counterclockwise in the drawing to cause the electrode tabs 113 of the cell group 100G and the laser oscillator 705 to face each other, as illustrated in FIG. 14 and FIG. 15. Furthermore, the bus bar holder 132, by which the bus bars 131 are integrally held, is kept pressed while being abutted on the corresponding electrode tabs 113 of the cell group 100G by means of a robot arm. Furthermore, the laser oscillator 705 irradiates the laser light L1 onto the bus bar 131, and subjects the bus bar 131 and the distal end portions 113d of the electrode tabs 113 to, for example, spot welding, to form the first joining portion T1, as illustrated in FIG. 16 and FIG. 17. The first joining portion T1 extends linearly along the short side direction Y.

Then, the anode side terminal 133 is joined to the anode side bus bar 131A corresponding to the anode side terminal end (upper right in FIG. 6), from among the bus bars 131 arranged in a matrix, as illustrated in FIG. 18. In the same manner, the cathode side terminal 134 is, for example, spot welded to the cathode side bus bar 131K corresponding to the cathode side terminal end (lower left in FIG. 6), from among the bus bars 131 arranged in a matrix. The second joining portion T2 extends linearly along the short side direction Y.

Here, welding is carried out such that the second joining portion T2 between the bus bar 131 (anode side bus bar 131A or cathode side bus bar 131K) and the terminal member (anode side terminal 133 or cathode side terminal 134), and the first joining portion T1 between the electrode tab 113 and the bus bar 131 are in different positions.

The mounting step in which a protective cover 140 is attached to the bus bar 131 will be described, with reference to FIG. 20.

Figure 20:
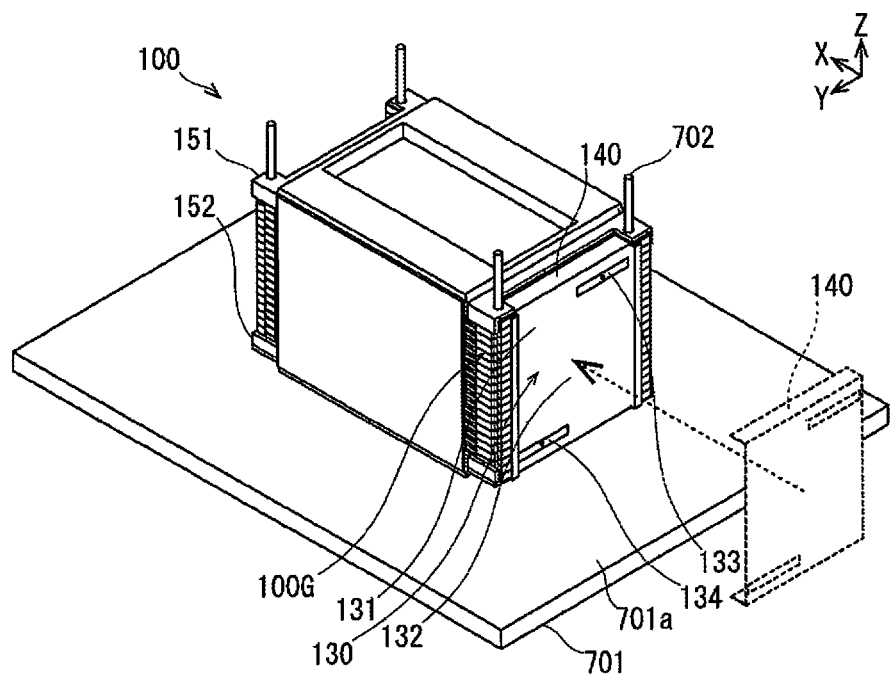
FIG. 20 is a perspective e view schematically illustrating a state in which a protective cover is attached to the bus bar unit, following FIG. 18 and FIG. 19.

FIG. 20 is a perspective view schematically illustrating a state in which a protective cover 140 is attached to the bus bar unit 130, following FIG. 18 and FIG. 19.

In the mounting step, a protective cover 140 is attached to the bus bar unit 130 while fitting the upper end 140b and the lower end 140c of the protective cover 140 onto the bus bar unit 130, using the robot arm. The upper end 140b and the lower end 140c of the protective cover 140 may be joined to the bus bar unit 130 by an adhesive. The protective cover 140 exposes the anode side terminal 133 to the outside from the first opening 140d, and exposes the cathode side terminal 134 from the second opening 140e to the outside. The protective cover 140 covers the bus bar unit 130 to prevent the bus bars 131 from short-circuiting with each other and from coming in contact with an external member and being short-circuited or causing electrical leakage. When manufacture is completed, the battery pack 100 is removed from the mounting table 701 and carried out to an inspection step for inspecting the battery performance, and the like.

The manufacturing method of the battery pack 100 described with reference to FIGS. 12-20 may be embodied by an automatic machine in which all of the steps are controlled by means of a controller, a semiautomatic machine in which a portion of the steps are carried out by means of a worker, or a manual machine in which all of the steps are carried out by means of a worker.

According to the battery pack 100 and the method for assembling a battery pack 100 according to the embodiment described above, the following action and effects are achieved.

The battery pack 100 comprises a cell group 100G, a bus bar 131, and a terminal member (anode side terminal 133 or cathode side terminal 134). The cell group 100G is obtained by stacking, in the thickness direction, a plurality of unit cells 110 provided with a cell body 110H, which includes a power generation element 111 and is formed into a flat shape, and an electrode tab 113 protruding out from the cell body 110H, and the electrode tabs 113 are arranged along the stacking direction. The bus bar 131 is formed into a flat plate shape and joined to the electrode tabs 113 of the unit cells 110, and it electrically connects the electrode tabs 113 of at least two of the unit cells 110 with each other. The terminal member (anode side terminal 133 or cathode side terminal 134) is joined to the bus bar 131 (anode side bus bar 131A or cathode side bus bar 131K) and relays the input and output of electric power in the cell group 100G. Here, the battery pack 100 is configured such that a terminal joining position (corresponding to the position of the second joining portion T2) where the terminal member (anode side terminal 133 or cathode side terminal 134) is joined to the bus bar 131 is disposed away from the joining position (corresponding to the position of the first joining portion T1) between the bus bar 131 and the electrode tabs 113, when viewing the surface on which the electrode tabs 113 are arranged in the cell group 100G from a direction that is orthogonal to the surface.

In the manufacturing method of a battery pack 100, a cell group 100G, a bus bar 131, and a terminal member (anode side terminal 133 or cathode side terminal 134) are welded. The cell group 100G is obtained by stacking, in the thickness direction, a plurality of unit cells 110 provided with a cell body 110H, which includes a power generation element 111 and is formed into a flat shape, and an electrode tab 113 protruding out from the cell body 110H, and the electrode tabs 113 are arranged along the stacking direction. The bus bar 131 is formed into a flat plate shape and joined to the electrode tabs 113 of the unit cells 110, and it electrically connects the electrode tabs 113 of at least two of the unit cells 110 with each other. The terminal member (anode side terminal 133 or cathode side terminal 134) is joined to the bus bar 131 (anode side bus bar 131A or cathode side bus bar 131K) and relays the input and output of electric power in the cell group 100G. Here, in the manufacturing method of a battery pack, a terminal joining position where the terminal member (anode side terminal 133 or cathode side terminal 134) is joined to the bus bar 131 is disposed away from the joining position between the bus bar 131 and the electrode tabs 113, when viewing the surface on which the electrode tabs 113 are arranged in the cell group 100G from a direction that is orthogonal to the surface.

According to a battery pack 100 configured in this manner, a joining position between the bus bar 131 and the terminal member (anode side terminal 133 or cathode side terminal 134), and a joining position between the bus bar 131 and the electrode tab 113, are provided on the side of the surface on which the electrode tabs 113 are arranged in the cell group 100G. Therefore, with the battery pack 100, it is possible to reduce the size of the device, compared to a case in which a joining position between the bus bar 131 and the terminal member (anode side terminal 133 or cathode side terminal 134), and a joining position between the bus bar 131 and the electrode tab 113, are provided on mutually different surface sides. In addition, in the manufacturing method of a battery pack 100, since welding can be completed on the same surface only, it is possible to reduce the space required for welding the component members, compared to a case in which a joining position between the bus bar 131 and the terminal member (anode side terminal 133 or cathode side terminal 134), and a joining position between the bus bar 131 and the electrode tab 113, are provided on mutually different surface sides.

Additionally, according to such a configuration, since the welding between the electrode tab 113 and the bus bar 131 as well as the terminal member (for example, the cathode side terminal 134) can be completed on the same plane of the battery pack 100, unlike a case in which the first joining portion T1 and the second joining portion T2 are present on a plurality of planes of the battery pack 100, it is unnecessary to change setups during manufacturing. A setup change during manufacturing includes, for example, rotating the battery pack 100 during manufacture according to the orientation of the laser oscillator 705 for welding. If a plurality of laser oscillators 705 is installed so as to face a plurality of planes of the battery pack 100, the cost required for manufacturing the battery pack 100 increases. In this manner, by disposing the first joining portion T1 and the second joining portion T2 on the same surface side, it is possible to improve the productivity of the battery pack 100, and to configure the battery pack 100 at a low cost. Such a battery pack 100 manufacturing method is particularly effective when it entails welding by means of a non-contact type heat input method, as typified by laser welding.

Furthermore, a plurality of bus bars 131 and a terminal member (anode side terminal 133 or cathode side terminal 134) is provided as separate bodies. In the terminal member (anode side terminal 133 or cathode side terminal 134), a terminal surface for carrying out the input and output of electric power (other end portion 133c or 134c) is provided facing the direction that intersects with the stacking direction Z (for example, longitudinal direction X).

According to such a configuration, a first joining portion T1 between the electrode tab 113 and the bus bar 131, and a second joining portion T2 between the bus bar 131 and the terminal member (for example, cathode side terminal 134), are provided on the same surface side, and the input and output of electric power between the cell group 100G and the outside can be carried out along a direction that intersects with the layering direction Z (for example, longitudinal direction X).

Furthermore, the cell group 100G comprises spacers (first spacer 121) that are disposed between the electrode tabs 113 of the stacked unit cells 110. The first spacer 121 is provided with a supporting portion 121j, which abuts the electrode tab 113 from the opposite side of the bus bar 131 and supports the electrode tab 113.

According to such a configuration, the electrode tab 113 can be brought into close contact with the bus bar 131, and the bus bar 131 can be brought into close contact with the terminal member (for example, cathode side terminal 134), by the supporting portion 121j of the first spacer 121. Therefore, it is possible to obtain sufficient conduction between the electrode tabs 113 and the bus bars 131 of each unit cell 110 to obtain the desired electrical characteristics of the battery pack 100, regardless of deformation of each electrode tab 113. In addition, in the battery pack 100 manufacturing method, it is possible sufficiently weld the electrode tabs 113 and the bus bars 131 of each unit cell 110, regardless of deformation of each electrode tab 113.

Furthermore, in the manufacturing method of a battery pack 100, a terminal member (anode side terminal 133 or cathode side terminal 134), in which the thickness of the welding portion with the bus bar 131 is equal to the thickness of the bus bar 131, is used. In this manufacturing method of a battery pack 100, laser light L1 for welding is irradiated from the terminal member (anode side terminal 133 or cathode side terminal 134) side, and the terminal member (anode side terminal 133 or cathode side terminal 134) and the bus bar 131 (anode side bus bar 131A or cathode side bus bar 131K) are welded without penetrating at least the bus bar 131 (anode side bus bar 131A or cathode side bus bar 131K).

According to such a configuration, it is possible to set the conditions of the laser light L1 for welding to be the same for when the electrode tab 113 and the bus bar 131 are welded and when the bus bar 131 and the terminal member (for example, cathode side terminal 134) are welded. Therefore, it is possible to carry out welding between the electrode tab 113 and the bus bar 131, as well as welding between the bus bar 131 and the terminal member (for example, cathode side terminal 134) without changing the conditions of the laser light L1 for welding, and such laser welding can be easily carried out.

MODIFIED EXAMPLE 1 OF THE EMBODIMENTS

Figure 21A:
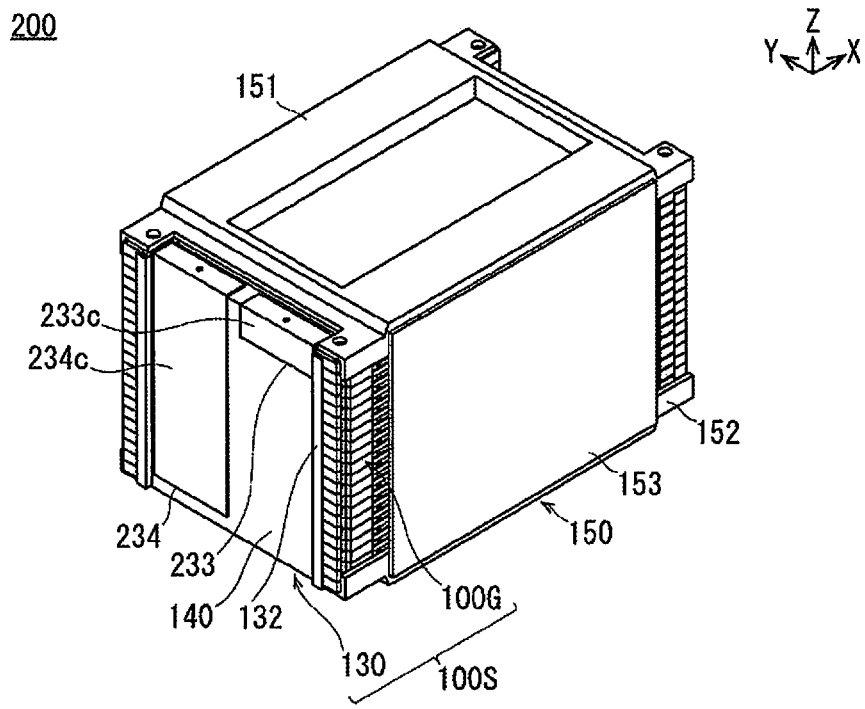
FIG. 21A is a perspective view illustrating a battery pack configured by stacking an odd number of cell sub-assemblies in a battery pack according to a modified example 1 of the embodiment.
Figure 21B:
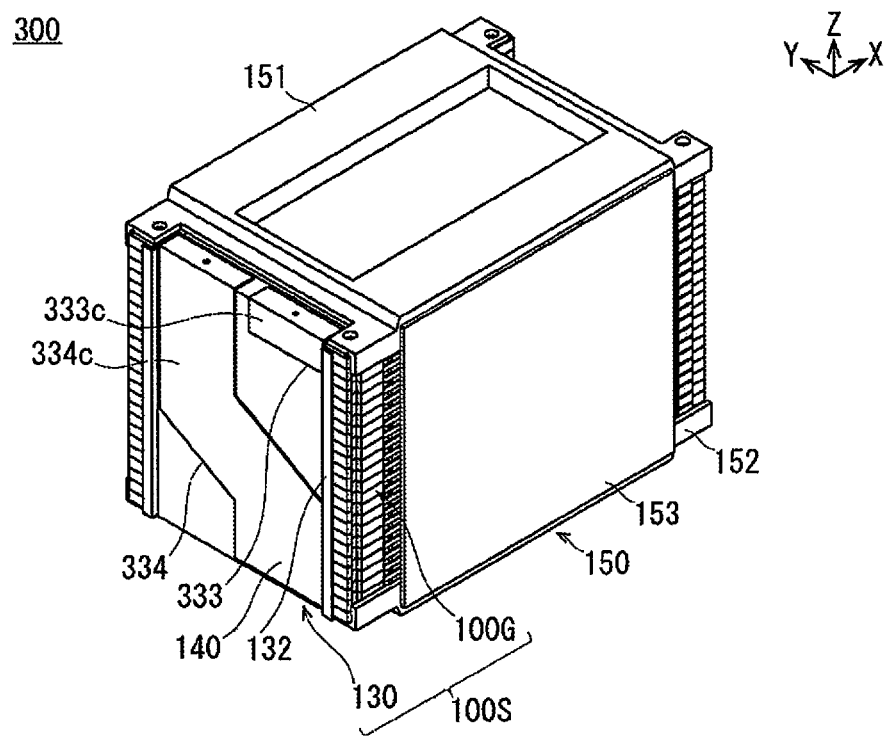
FIG. 21B is a perspective view illustrating a battery pack configured by stacking an even number of cell sub-assemblies in a battery pack according to a modified example 1 of the embodiment.

FIG. 21A is a perspective view illustrating a battery pack 200 configured by stacking an odd number of cell sub-assemblies, and FIG. 21B is a perspective view illustrating a battery pack 300 configured by stacking an even number of cell sub-assemblies. Members that are the same as those of the battery pack 100 according to the embodiment are given the same reference symbols, and descriptions thereof are partially omitted.

The battery packs 200 and 300 according to Modified Example 1 of the embodiment are different from the battery pack 100 according to the embodiment described above, in that a terminal surface of the terminal member for carrying out the input and output of electric power is parallel to the stacking direction Z.

The battery pack 200 will be described with reference to FIG. 21A.

The anode side terminal 233 corresponds to the anode side terminal end of the cell group 100G configured by alternately stacking four first cell sub-assemblies 100M and three second cell sub-assemblies 100N one by one. The other end portion 233c of the anode side terminal 233 is extended linearly above the stacking direction Z along the side surface 140a of the protective cover 140 and extended to the unit cell 110 side along the upper end 140b of the protective cover 140.

The cathode side terminal 234 corresponds to the cathode side terminal end of the cell group 100G configured by alternately stacking four first cell sub-assemblies 100M and three second cell sub-assemblies 100N one by one. The other end portion 234c of the cathode side terminal 234 is extended linearly above the stacking direction Z along the side surface 140a of the protective cover 140 and extended to the unit cell 110 side along the upper end 140b of the protective cover 140.

In the battery pack 200, since the number of cell sub-assemblies is an odd number (for example, seven), the position of the anode side terminal 233 and the position of the cathode side terminal 234 are not aligned along the stacking direction Z, but are aligned along the short side direction Y. Therefore, the anode side terminal 233 and the cathode side terminal 234 do not interfere with each other, even when extended linearly along the stacking direction Z.

The battery pack 300 will be described with reference to FIG. 21B.

The anode side terminal 333 corresponds to the anode side terminal end of the cell group 100G configured by alternately stacking four first cell sub-assemblies 100M and four second cell sub-assemblies 100N one by one. The other end portion 333c of the anode side terminal 333 is extended linearly above the stacking direction Z along the side surface 140a of the protective cover 140 and extended to the unit cell 110 side along the upper end 140b of the protective cover 140.

The cathode side terminal 334 corresponds to the cathode side terminal end of the cell group 100G configured by alternately stacking four first cell sub-assemblies 100M and four second cell sub-assemblies 100N one by one. The other end portion 334c of the cathode side terminal 334 is extended linearly above the stacking direction Z along the side surface 140a of the protective cover 140 and extended to the unit cell 110 side along the upper end 140b of the protective cover 140.

In the battery pack 300, since the number of cell sub-assemblies is an even number (for example, eight), the position of the anode side terminal 333 and the position of the cathode side terminal 334 are aligned along the stacking direction Z. Therefore, interference with the anode side terminal 333 is avoided by, for example, extending the other end portion 334c of the cathode side terminal 334 while bending along the side surface 140a of the protective cover 140.

According to the battery packs 200 and 300 of Modified Example 1 of the embodiment described above, in addition to the action and effects of the battery pack 100 according to the embodiment, the following action and effects are achieved.

The battery packs 200 and 300 of Modified Example 1 of the embodiment comprises a plurality of bus bars 131 and a terminal member (for example, the cathode side terminal 234 of the battery pack 200) as separate bodies. The terminal member (for example, the cathode side terminal 234 of the battery pack 200) is provided with a terminal surface for carrying out the input and output of electric power that is parallel to the stacking direction Z.

According to such a configuration, a first joining portion T1 between the electrode tab 113 and the bus bar 131, and a second joining portion T2 between the bus bar 131 and the terminal member (for example, cathode side terminal 134), are provided on the same surface side, and the input and output of electric power between the cell group 100G and the outside can be carried out along the stacking direction Z.

MODIFIED EXAMPLE 2 OF THE EMBODIMENTS

Figure 22A:
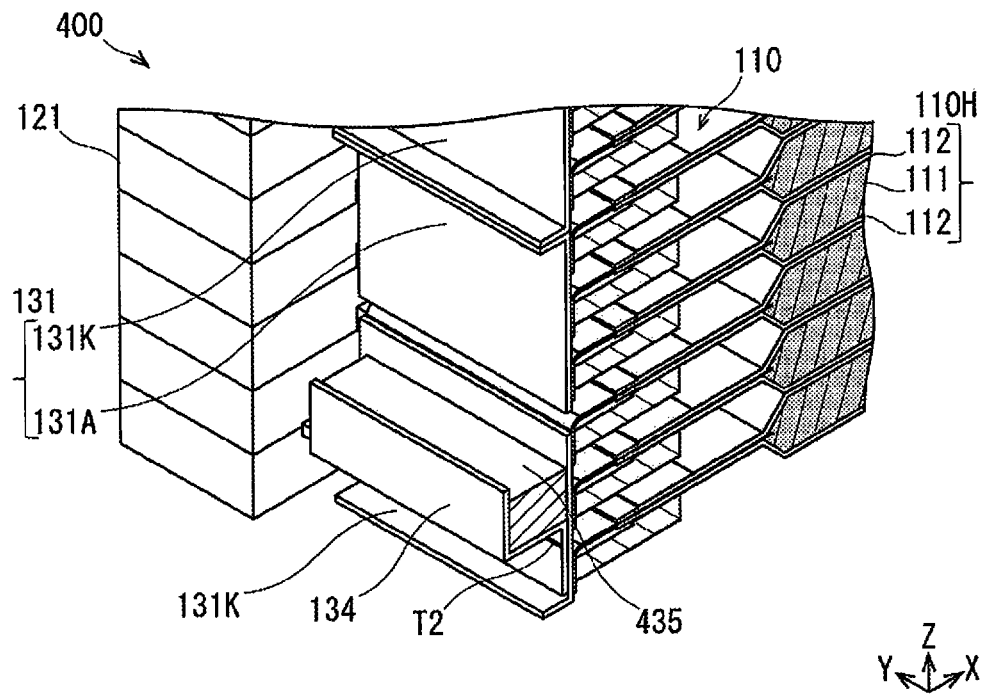
FIG. 22A is a perspective view illustrating a cross-section of the principle part of a state in which the cathode side terminal is joined to the cathode side bus bar in a battery pack according to a modified example 2 of the embodiment.
Figure 22B:
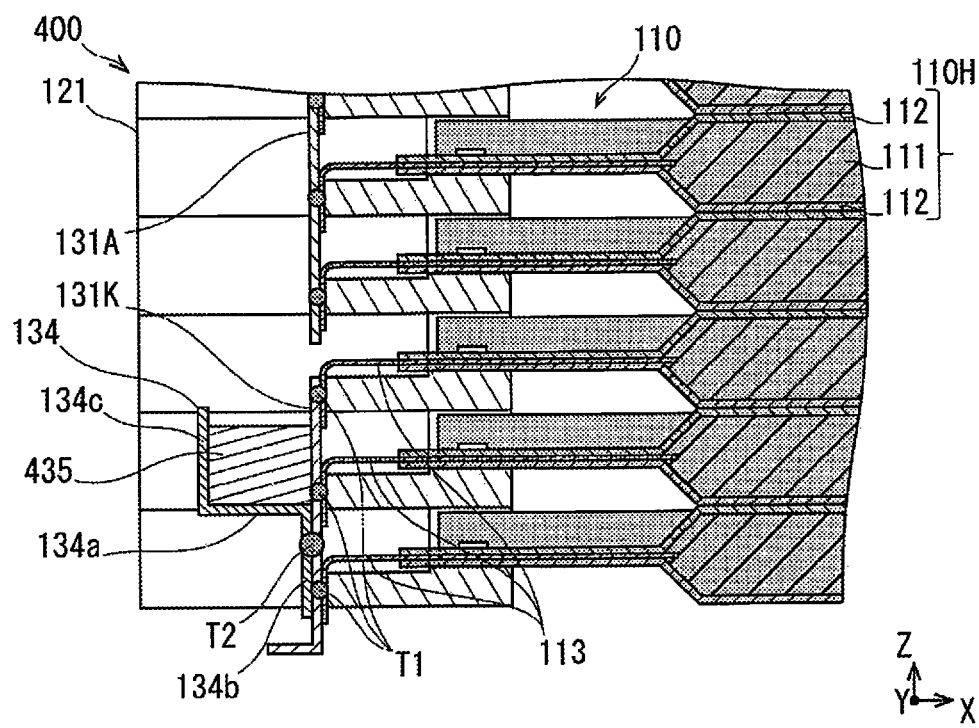
FIG. 22B is a side view illustrating FIG. 22A from the side in a battery pack according to a modified example 2 of the embodiment.

FIG. 22A is a perspective view illustrating a cross-section of the principle part of a state in which the cathode side terminal 134 is joined to the cathode side bus bar 131K, and FIG. 22B is a side view illustrating FIG. 22A as viewed from the side. Members that are the same as those of the battery pack 100 according to the embodiment are given the same reference symbols, and descriptions thereof are partially omitted.

The battery pack 400 according to Modified Example 2 of the embodiment is different from the battery pack 100 according to the embodiment described above, in the point of comprising a holding member 435 for holding the terminal member (anode side terminal 133 or cathode side terminal 134).

The battery pack 400 will be described with reference to FIG. 22.

The holding member 435 is provided with one each of an anode side terminal 133 and a cathode side terminal 134. The holding member 435 has a rectangular parallelepiped shape, which is joined to the cathode side bus bar 131 corresponding to an electrical terminal end, from among the plurality of provided bus bars 131, as illustrated in FIG. 22.

The holding member 435 is joined to the cathode side terminal 134 so as to support the central portion 134a and the other end portion 134c of the cathode side terminal 134 joined to the cathode side bus bar 131K. The holding member 435 may be configured as one portion of the first spacer 121.

According to the battery pack 400 of Modified Example 2 of the embodiment described above, in addition to the action and effects of the battery pack 100 according to the embodiment, the following action and effects are achieved.

The battery pack 400 of Modified Example 2 of the embodiment comprises a holding member 435 that is disposed on the bus bar 131 and holds the terminal member (anode side terminal 133 or cathode side terminal 134).

According to such a configuration, the holding member 435 can carry out positioning while holding the terminal member (for example, the cathode side terminal 134). Furthermore, according to such a configuration, the holding member 435 can function as a rotation stop of the terminal member (for example, the cathode side terminal 134) with respect to an engagement torque, when engaging an external electric power line with the terminal member (for example, the cathode side terminal 134) by means of a screw, or the like.

Other than the foregoing, various modifications to the present invention based on the configurations described in the Claims are possible that also belong in the scope of the present invention.

The invention claimed is:

1. A battery pack comprising:
a cell group including a plurality of unit cells stacked in a stacking direction, each of the unit cells including a battery main body having a power generation element and a flat shape, and an electrode tab protruding out from the battery main body, each of the electrode tabs being arranged along the stacking direction;
a bus bar having a flat plate-shaped portion welded to the electrode tabs of the unit cells and electrically connecting the electrode tabs of at least two of the unit cells to each other; and
a terminal member welded to the flat plate-shaped portion of the bus bar, the terminal member transferring input and output of electric power in the cell group,
each of the electrode tabs comprising a distal end portion, the distal end portions of the electrode tabs being bent along the stacking direction,
the bent distal end portions of the electrode tabs being welded to a first surface of the flat plate-shaped portion of the bus bar, and the terminal member being welded to a second surface of the flat plate-shaped portion of the bus bar, the second surface being opposite the first surface,
the terminal member being disposed such that at least a portion of the terminal member overlaps the bent distal end portions of the electrode tabs in a direction perpendicular to the stacking direction, and
the terminal member being welded to the flat plate-shaped portion of the bus bar at a terminal welding position that is spaced away from respective welding positions between the flat plate-shaped portion of the bus bar and the electrode tabs in the stacking direction.

2. The battery pack according to claim 1, wherein
the bus bar having the flat plate-shaped portion is one of a plurality of bus bars, the plurality of bus bars each being stacked in the stacking direction, the plurality of bus bars being held by a bus bar holder and arranged in a matrix so as to face the bent distal end portions of the electrode tabs, and
the terminal member welded to the bus bar having the flat plate-shaped portion is provided with a terminal surface facing at least one of the stacking direction and the direction perpendicular to the stacking direction for transferring the input and output of the electric power.

3. The battery pack according to claim 1, further comprising
a holding member that is disposed on the flat plate-shaped portion of the bus bar that holds the terminal member.

4. The battery pack according claim 1, wherein
the cell group comprises a spacer disposed between the electrode tabs of the stacked unit cells, and
the spacer is provided with a supporting portion abutting one of the electrode tabs from a side of the one of the electrode tabs that is opposite the flat plate-shaped portion of the bus bar and supporting the one of the electrode tabs.

5. A battery pack manufacturing method comprising:
obtaining a cell group that includes a plurality of unit cells stacked in a stacking direction, each of the unit cells including a battery main body having a power generation element and a flat shape, and an electrode tab protruding out from the battery main body, each the electrode tabs being arranged along the stacking direction;
welding a bus bar having a flat plate-shaped portion with the electrode tabs of the unit cells and electrically connecting the electrode tabs of at least two of the unit cells; and
welding a terminal member to the flat plate-shaped portion of the bus bar, the terminal member transferring input and output of electric power in the cell group,
each of the electrode tabs comprising a distal end portion, the distal end portions of the electrode tabs being bent along the stacking direction,
the bent distal end portions of the electrode tabs being welded to a first surface of the flat plate-shaped portion of the bus bar, and the terminal member being welded to a second surface of the flat plate-shaped portion of the bus bar, the second surface being opposite the first surface,
the terminal member being disposed such that at least a portion of the terminal member overlaps the bent distal end portions of the electrode tabs in a direction perpendicular to the stacking direction, and
the terminal member being welded to the flat plate-shaped portion of the bus bar at a terminal welding position that is spaced away from respective welding positions between the flat plate-shaped portion of the bus bar and the electrode tabs in the stacking direction.

6. The battery pack manufacturing method according to claim 5, wherein
a thickness of the terminal member at the terminal welding position is equal to a thickness of the bus bar, and
the welding of the terminal member to the flat plate-shaped portion of the bus bar is performed without penetrating the bus bar by irradiating laser light from a terminal member side.

7. The battery pack according to claim 1, wherein
the terminal member is a plate that is bent such that the end portions of the terminal member are folded in different directions along the stacking direction.

* * * * *